(12) United States Patent
Horikawa

(10) Patent No.: US 11,059,928 B2
(45) Date of Patent: Jul. 13, 2021

(54) MULTI-COMPONENT COPOLYMER, RUBBER COMPOSITION, CROSSLINKED RUBBER COMPOSITION AND RUBBER ARTICLE

(71) Applicant: BRIDGESTONE CORPORATION, Tokyo (JP)

(72) Inventor: Yasuo Horikawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 545 days.

(21) Appl. No.: 15/766,057

(22) PCT Filed: Oct. 11, 2016

(86) PCT No.: PCT/JP2016/004544
§ 371 (c)(1),
(2) Date: Apr. 5, 2018

(87) PCT Pub. No.: WO2017/064861
PCT Pub. Date: Apr. 20, 2017

(65) Prior Publication Data
US 2018/0282456 A1 Oct. 4, 2018

(30) Foreign Application Priority Data
Oct. 16, 2015 (JP) .............................. JP2015-204955

(51) Int. Cl.
| | | |
|---|---|---|
| C08F 236/06 | (2006.01) | |
| C08F 210/02 | (2006.01) | |
| C08F 212/08 | (2006.01) | |
| C08F 236/08 | (2006.01) | |
| C08F 297/06 | (2006.01) | |
| C08L 9/06 | (2006.01) | |
| C08L 23/22 | (2006.01) | |
| C08L 53/00 | (2006.01) | |

(52) U.S. Cl.
CPC .......... *C08F 236/06* (2013.01); *C08F 210/02* (2013.01); *C08F 212/08* (2013.01); *C08F 236/08* (2013.01); *C08F 297/06* (2013.01); *C08L 9/06* (2013.01); *C08L 23/22* (2013.01); *C08L 53/00* (2013.01); *C08F 2500/01* (2013.01); *C08F 2800/10* (2013.01)

(58) Field of Classification Search
CPC .... C08F 236/06; C08F 210/02; C08F 212/08; C08F 236/08; C08F 297/06; C08F 2500/01; C08F 2800/10; C08L 9/06; C08L 23/22; C08L 53/00
USPC ...................................................... 526/340
See application file for complete search history.

(56) References Cited

U.S. PATENT DOCUMENTS

| | | | |
|---|---|---|---|
| 3,634,218 A * | 1/1972 | Gotohda et al. ...... | C08F 255/00 522/116 |
| 4,185,049 A | 1/1980 | Kruse et al. | |
| 2013/0197157 A1 | 8/2013 | Kaita et al. | |
| 2014/0179861 A1 | 6/2014 | Horikawa et al. | |
| 2015/0126695 A1 | 5/2015 | Kaita et al. | |
| 2017/0129981 A1 | 5/2017 | Oishi et al. | |
| 2017/0137552 A1 | 5/2017 | Oishi | |

FOREIGN PATENT DOCUMENTS

| | | | | |
|---|---|---|---|---|
| EP | 1777240 A1 | 4/2007 | | |
| EP | 2489688 A1 | 8/2012 | | |
| GB | 2 156 368 A | 10/1985 | | |
| GB | 2156368 A | * | 10/1985 | ............ C08F 297/00 |
| JP | 61-12712 A | 1/1986 | | |
| JP | 09-255742 A | 9/1997 | | |
| JP | 2013-194100 A | 9/2013 | | |
| WO | 9850463 A1 | 11/1998 | | |
| WO | 2007048760 A1 | 5/2007 | | |
| WO | WO-2007048760 A1 | * | 5/2007 | ............ C08F 236/10 |
| WO | 2012/014455 A1 | 2/2012 | | |
| WO | 2012/164914 A1 | 12/2012 | | |
| WO | 2013/179651 A1 | 12/2013 | | |
| WO | 2015/190072 A1 | 12/2015 | | |
| WO | 2015/190073 A1 | 12/2015 | | |

OTHER PUBLICATIONS

Communication dated Aug. 30, 2019 from the State Intellectual Property Office of the P.R.C in application No. 201680060594.2.
Communication dated Feb. 22, 2019 from the European Patent Office in application No. 16855115.8.
Communication dated Dec. 10, 2018 from the European Patent Office in application No. 16855115.8.
Arevalillo, A., et al., "Thermo-mechanical properties linked to rheological features in high molecular weight SEBS copolymers: Effect of styrene content and ethylene/butylene proportion", Polymer Testing, 2012, vol. 31, XP-002785972, pp. 849-854 (6 pages).
Kraton™"Polymers for Oil Modification: Versatile Solutions for Synthetic and Natural Based Oils", XP-002785973, Sep. 6, 2016, 8 pages.
Sierra, C.A., et al., "Thermal and mechanical properties of poly-(styrene-b-ethylene-co-butylene-b-styrene) triblock copolymers", Polymer, vol. 38, No. 17, 1997, XP-002783376, pp. 4325-4335 (11 pages).
Allen, N., et al., "Influence of ozone on styrene-ethylene-butylene-styrene (SEBS) copolymer", Polymer Degradation and Stability, vol. 79, XP-002785974, 2003, pp. 297-307 (11 pages).

(Continued)

*Primary Examiner* — Ling Siu Choi
*Assistant Examiner* — Ronald Grinsted
(74) *Attorney, Agent, or Firm* — Sughrue Mion, PLLC

(57) ABSTRACT

Provided is a multi-component copolymer comprising conjugated diene units, non-conjugated olefin units and aromatic vinyl units, wherein: a weight-average molecular weight of chain parts, divided by the conjugated diene units and each containing one or more of the non-conjugated olefin units and/or one or more of the aromatic vinyl units, is 50,000 or more. A rubber composition comprising the multi-component copolymer, a crosslinked rubber composition, and a rubber article comprising the crosslinked rubber composition are also provided.

17 Claims, 4 Drawing Sheets

(56) References Cited

OTHER PUBLICATIONS

Heck, B., et al., "SAXS and TEM Studies on Poly(styrene)-block-poly(ethene-co-1-ene)-block-poly(styrene) in Bulk and at Various Interfaces", Macromolecules, vol. 30, No. 16, XP-002785975, 1997, pp. 4559-4566 (8 pages).
International Search Report of PCT/JP2016/004544 dated Dec. 27, 2016 [PCT/ISA/210].
B.K. Hong, et al., "Effects of Molecular weight of SEBS triblock copolymer on the morphology, impact strength, and rheological property of syndiotactic polystyrene/ethylene-propylene rubber blends", POLYMER 41, 2000, pp. 2069-2079, XP-002783627.
Makoto Motomatsu et al., "Microphase domains of poly(styrene-block-ethylene/butylene-block-styrene) triblock copolymers studied by atomic force microscopy", Polymer, vol. 38, No. 8, pp. 1779-1785, 1997, XP-004056019.
Communication dated Aug. 24, 2018, from European Patent Office in counterpart application No. 16855115.8.

\* cited by examiner

MULTI-COMPONENT COPOLYMER, RUBBER COMPOSITION, CROSSLINKED RUBBER COMPOSITION AND RUBBER ARTICLE

CROSS REFERENCE TO RELATED APPLICATIONS

This application is a National Stage of International Application No. PCT/JP2016/004544, filed Oct. 11, 2016, claiming priority based on Japanese Patent Application No. 2015-204955, filed Oct. 16, 2015, the disclosures of which are herein incorporated by reference.

TECHNICAL FIELD

This disclosure relates to a multi-component copolymer, a rubber composition, a crosslinked rubber composition and a rubber article.

BACKGROUND

Generally, rubber compositions used in manufacture of rubber articles such as tires, conveyor belts, anti-vibration rubbers and seismic isolation rubbers are required to have high durability. Here, conventional diene based rubbers used in the rubber industry frequently, such as natural rubbers (NR), butadiene rubbers (BR) and styrene-butadiene rubbers (SBR), have excellent wear resistance, etc., but do not have sufficient ozone resistance. Then, in order to satisfy the aforementioned requirement, various rubber components and rubber compositions have been developed.

For example, there are cases where an olefin based rubber having excellent ozone resistance, such as an ethylene-propylene rubber (EPM), an ethylene-propylene-diene rubber (EPDM), a styrene-ethylene-butylene-styrene rubber (SEBS) or a hydrogenated SBR, is used in a manner blended with a diene based rubber.

Moreover, PTL1 discloses a copolymer of a conjugated diene compound and a non-conjugated olefin in which conjugated diene parts (parts derived from a conjugated diene compound) have a cis-1,4 bond content of greater than 70.5 mol % and a non-conjugated olefin is contained in an amount of 10 mol % or more, and discloses that this copolymer is used for manufacturing rubber having good crack growth resistance and good ozone resistance.

CITATION LIST

Patent Literature

PTL1: WO2012014455A1

SUMMARY

Technical Problem

However, a copolymer capable of further improving the crack growth resistance and the ozone resistance of a rubber composition is desired.

It would thus be helpful to provide a multi-component copolymer, a rubber composition and a crosslinked rubber composition having excellent crack growth resistance and ozone resistance. Moreover, it would thus be helpful to provide a rubber article having excellent crack growth resistance and ozone resistance, which uses the aforementioned crosslinked rubber composition.

Solution to Problem

As a result of intensive study, we accomplished this disclosure by discovering that a copolymer having at least three specific units in a specific form has excellent crack growth resistance and ozone resistance.

In order to beneficially solve the aforementioned problem, this disclosure provides a multi-component copolymer comprising conjugated diene units, non-conjugated olefin units and aromatic vinyl units, wherein: a weight-average molecular weight of chain parts, divided by the conjugated diene units and each containing one or more of the non-conjugated olefin units and/or one or more of the aromatic vinyl units, is 50,000 or more.

In the present Specification, the term "conjugated diene unit" refers to a unit in the copolymer equivalent to a unit derived from a conjugated diene compound; the term "non-conjugated olefin unit" refers to a unit in the copolymer equivalent to a unit derived from a non-conjugated olefin compound; and the term "aromatic vinyl unit" refers to a unit in the copolymer equivalent to a unit derived from an aromatic vinyl compound.

Moreover, in the present Specification, the term "conjugated diene compound" refers to conjugated-system diene compound; the term "non-conjugated olefin compound" refers to a non-conjugated-system aliphatic unsaturated hydrocarbon compound having one or more carbon-carbon double bonds; and the term "aromatic vinyl compound" refers to an aromatic compound substituted with at least a vinyl group. Moreover, the "aromatic vinyl compound" is not included in the conjugated diene compound.

Furthermore, in the present Specification, the term "multi-component copolymer" refers to a copolymer obtained by polymerizing monomers of three types or more.

Advantageous Effect

According to this disclosure, it is possible to provide a multi-component copolymer, a rubber composition and a crosslinked rubber composition having excellent crack growth resistance and ozone resistance. Moreover, according to this disclosure, it is possible to provide a rubber article having excellent crack growth resistance and ozone resistance, which uses the aforementioned crosslinked rubber composition.

DETAILED DESCRIPTION

Figure 1:
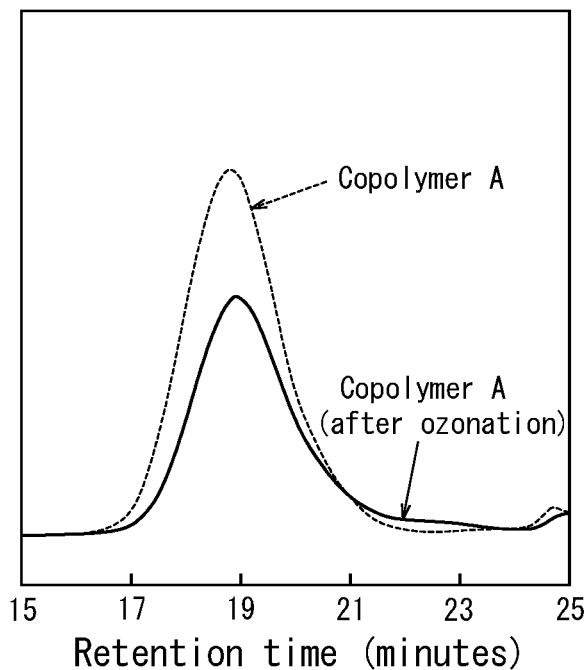
FIG. 1 illustrates high temperature GPC curves before and after ozonation of a copolymer A according to one embodiment of this disclosure.

In below, the method of this disclosure is described in detail with reference to embodiments thereof.

(Multi-Component Copolymer)

The multi-component copolymer of this disclosure is principally characterized by comprising conjugated diene units, non-conjugated olefin units and aromatic vinyl units. Namely, different from a conventional styrene-butadiene rubber (SBR) which is frequently used, the multi-component copolymer of this disclosure has non-conjugated olefin units in addition to conjugated diene units and aromatic vinyl units. Due to the coexistence of the non-conjugated olefin units, a double bond content in a main chain is suppressed, which improves the ozone resistance.

The multi-component copolymer of this disclosure is further characterized in that a weight-average molecular weight of chain parts, divided by the conjugated diene units and each containing one or more of the non-conjugated olefin units and/or one or more of the aromatic vinyl units, is 50,000 or more. As used herein, the "chain parts, divided by the conjugated diene units and each containing one or more of the non-conjugated olefin units and/or one or more of the aromatic vinyl units" (hereinafter referred to as "the chain parts each containing one or more of the non-conjugated olefin units and/or one or more of the aromatic vinyl units" as well) refer to chain parts remaining when excluding all conjugated diene units from the multi-component copolymer, each of which contains one or more non-conjugated olefin units and/or one or more aromatic vinyl units.

Generally, a bicopolymer obtained by polymerizing one conjugated diene compound and one non-conjugated olefin compound has a large chain length of parts of continuous units derived singly from the non-conjugated olefin compound, in particular, a chain length of parts of continuous units derived from ethylene in the case of using ethylene, and thus tends to have increased crystallinity. In the case of using such copolymer as a rubber material, increase of the crystallinity probably inhibits improvement of the crack growth resistance.

As a result of study, we discovered that by setting the weight-average molecular weight of the chain parts, divided by the conjugated diene units and each containing one or more of the non-conjugated olefin units and/or one or more of the aromatic vinyl units, to 50,000 or more, it is possible to improve the crack growth resistance.

Although the details are still uncertain, it is considered that if the weight-average molecular weight of such chain parts is 50,000 or more, such chain parts form a phase structure, which improves the ozone resistance. Moreover, it is considered that such phase structure disperses a stress applied to the rubber, which improves the crack growth resistance.

In addition, chain parts including the conjugated diene units improve a compatibility with a diene based rubber, and preferentially form a reinforcement layer together with a filler, which further improves the crack growth resistance.

Due to these reasons, the multi-component copolymer of this disclosure is regarded as having excellent crack growth resistance and ozone resistance.

In the multi-component copolymer of this disclosure, from the viewpoint of forming a layer structure which further improves the crack growth resistance and the ozone resistance, the weight-average molecular weight of the chain parts each containing one or more of the non-conjugated olefin units and/or one or more of the aromatic vinyl units is more preferably 100,000 to 400,000, even more preferably 100,000 to 250,000.

Note that the chain parts each containing one or more of the non-conjugated olefin units and/or one or more of the aromatic vinyl units are partial chains remaining when the conjugated diene units are excluded from the multi-component copolymer, and may be any one containing at least one or more of the non-conjugated olefin units or the aromatic vinyl units. Therefore, it may be one containing only the non-conjugated olefin units, one containing only the aromatic vinyl units, or one containing both the non-conjugated olefin units and the aromatic vinyl units. In the case where the chain parts contain both the non-conjugated olefin units and the aromatic vinyl units, partial chains composed of only the non-conjugated olefin units remaining when an aromatic vinyl unit component and any other monomer component (excluding a conjugated diene component) are excluded from the chain parts is referred to as "non-conjugated olefin parts linking only the non-conjugated olefin units" (hereinafter referred to simply as "the non-conjugated olefin parts" as well). In the case where a chain part is constituted by only the non-conjugated olefin units, the chain part itself is a "non-conjugated olefin part linking only the non-conjugated olefin units" hereinafter referred to simply as the "non-conjugated olefin part" as well).

In the multi-component copolymer of this disclosure, it is preferable that a peak top molecular weight of the chain parts, divided by the conjugated diene units and each containing one or more of the non-conjugated olefin units and/or one or more of the aromatic vinyl units, is 40,000 or more. In this connection, the "peak top molecular weight (Mp)" refers to a molecular weight obtained from a position of an apex of a peak of a molecular weight distribution from GPC. According to this configuration, it is possible to further improve the ozone resistance. It is more preferable that the weight-average molecular weight of the chain parts each containing one or more of the non-conjugated olefin units and/or one or more of the aromatic vinyl units is 100,000 or more. By setting the weight-average molecular weight of the chain parts each containing one or more of the non-conjugated olefin units and/or one or more of the aromatic vinyl units to 100,000 or more, it is possible to accelerate formation of the phase structure with such chain parts, and to thereby further improve the crack growth resistance and the ozone resistance. From the viewpoint of further improving the ozone resistance, the weight-average molecular weight of the chain parts each containing one or more of the non-conjugated olefin units and/or one or more of the aromatic vinyl units is more preferably 100,000 to 400,000, even more preferably 100,000 to 250,000.

The chain parts each containing one or more of the non-conjugated olefin units and/or one or more of the aromatic vinyl units may be obtained by rinsing with alcohol, etc. and drying a mixture obtained by ozonolyzing the multi-component copolymer. This is because that by decompositing the conjugated diene unit component via ozonolysis, and removing the same as a low molecular weight component soluble to alcohol, it is possible to remove the conjugated diene unit component while remaining the chain parts each containing one or more of the non-conjugated olefin units and/or one or more of the aromatic vinyl units. The weight-average molecular weight and the peak top molecular weight of the chain parts may be obtained via gel permeation chromatography (GPC) with polystyrene as a standard substance.

In the multi-component copolymer of this disclosure, it is preferable that a content of the chain parts each containing one or more of the non-conjugated olefin units and/or one or more of the aromatic vinyl units is 20 mass % or more. By setting the content of the chain parts each containing one or more of the non-conjugated olefin units and/or one or more of the aromatic vinyl units to 20 mass % or more, it is possible to accelerate formation of the phase structure with such chain parts, and to thereby further improve the crack growth resistance and the ozone resistance.

From the viewpoint of further improving the crack growth resistance and the ozone resistance, the content of the chain parts each containing one or more of the non-conjugated olefin units and/or one or more of the aromatic vinyl units is more preferably 20 mass % to 90 mass %, particularly preferably 25 mass % to 80 mass %.

The conjugated diene units in the multi-component copolymer of this disclosure are normally units derived from a conjugated diene compound as a monomer, where the conjugated diene compound preferably has a carbon number of 4 to 8. Specific examples of such conjugated diene compound include 1,3-butadiene, isoprene, 1,3-pentadiene, and 2,3-dimethyl-1,3-butadiene. The conjugated diene compounds may be used singly or in a combination of two or more. From the viewpoint of improving the compatibility with a diene based rubber (for example, general purpose rubbers such as BR and NR), and from the viewpoint of effectively improving a durability of a rubber composition or a rubber article such as tires using the multi-component copolymer, the conjugated diene compound as a monomer from which the conjugated diene units in the multi-component copolymer of this disclosure are derived preferably contains butadiene and/or isoprene, more preferably consists exclusively of butadiene and/or isoprene, even more preferably consists exclusively of butadiene. In other words, the conjugated diene units in the multi-component copolymer of this disclosure preferably include butadiene units and/or isoprene units, more preferably consist exclusively of butadiene units and/or isoprene units, even more preferably consist exclusively of butadiene units.

A content of the conjugated diene units in the multi-component copolymer of this disclosure is not specifically limited, but is preferably 50 mol % or less. By setting the content of the conjugated diene units to 50 mol % or less, it is possible to suppress the double bond content in the main chain, and to further improve the crack growth resistance and the ozone resistance. From the viewpoint of further improving the crack growth resistance and the ozone resistance, 1 mol % to 50 mol % is more preferable, and from the viewpoint of achieving both the compatibility with a diene based rubber and the ozone resistance, 5 mol % to 40 mol % is particularly preferable.

The non-conjugated olefin units in the multi-component copolymer of this disclosure are normally units derived from a non-conjugated olefin compound as a monomer, where the non-conjugated olefin compound preferably has a carbon number of 2 to 10. Specific examples of such non-conjugated olefin compound include: α-olefins such as ethylene, propylene, 1-butene, 1-pentene, 1-hexene, 1-heptene and 1-octene; and hetero atom substituted alkene compounds such as vinyl pivalate, 1-phenylthioethene and N-vinylpyrrolidone. The non-conjugated olefin compounds may be used singly or in a combination of two or more. From the viewpoint of generating a crystal capable of functioning well as a reinforcing member to thereby further improving the crack resistance and the wear resistance, the non-conjugated olefin compound as a monomer from which the non-conjugated olefin units in the multi-component copolymer of this disclosure are derived is preferably an acyclic non-conjugated olefin compound, where the acyclic non-conjugated olefin compound is more preferably an α-olefin, even more preferably an α-olefin containing ethylene, and from the viewpoint of further improving the crack growth resistance and the ozone resistance, particularly preferably consists exclusively of ethylene. In other words, the non-conjugated olefin units in the multi-component copolymer of this disclosure are preferably acyclic non-conjugated olefin units, where the acyclic non-conjugated olefin units are more preferably α-olefin units, even more preferably α-olefin units including ethylene units, and particularly preferably consist exclusively of ethylene units.

A content of the non-conjugated olefin units is not specifically limited, but is preferably 40 mol % or more. By setting the content of the non-conjugated olefin units to 40 mol % or more, it is possible to further suppress the double bond content in the main chain of the multi-component copolymer, to thereby further improve the crack growth resistance and the ozone resistance. From the viewpoint of further improving the crack growth resistance and the ozone resistance, the content of the non-conjugated olefin units is more preferably 40 mol % to 85 mol %, particularly preferably 45 mol % to 80 mol %.

The aromatic vinyl units in the multi-component copolymer of this disclosure are normally units derived from an aromatic vinyl compound as a monomer, where the aromatic vinyl compound preferably has a carbon number of 8 to 10. Examples of such aromatic vinyl compound include styrene, o-methylstyrene, m-methylstyrene, p-methylstyrene, o,p-dimethylstyrene, o-ethylstyrene, m-ethylstyrene and p-ethylstyrene. The aromatic vinyl compounds may be used singly or in a combination of two or more. From the viewpoint of improving the compatibility with a general purpose rubber such as SBR and the viewpoint of the cost, the aromatic vinyl compound as a monomer from which the aromatic vinyl units in the multi-component copolymer of this disclosure are derived preferably contains styrene, more preferably consists exclusively of styrene. In other words, the aromatic vinyl units in the multi-component copolymer of this disclosure preferably include styrene units, more preferably consist exclusively of styrene units.

A content of the aromatic vinyl units is not specifically limited, but is preferably 10 mol % or more. By setting it to 10 mol % or more, it is possible to suppress a length of non-conjugated olefin parts linking only the non-conjugated olefin units in the chain parts each containing one or more of the non-conjugated olefin units and/or one or more of the aromatic vinyl units (hereinafter referred to simply as "the non-conjugated olefin parts" as well), to thereby suppress formation of non-conjugated olefin crystal, which improves the rollability and further improves the ozone resistance. From the viewpoint of improving the rollability, further improving the ozone resistance and the compatibility with a general purpose rubber such as SBR while ensuring physical properties of the multi-component copolymer as a rubber, the content of the aromatic vinyl units is more preferably 3 mol % to 30 mol %, particularly preferably 10 mol % to 20 mol %.

Note that the multi-component copolymer of this disclosure may have any unit other than the aforementioned conjugated diene units, non-conjugated olefin units and aromatic vinyl units. However, from the viewpoint of obtaining the desired effects of this disclosure, a content of any unit other than the conjugated diene units, the non-conjugated olefin units and the aromatic vinyl units in the multi-component copolymer of this disclosure is more preferably 0 mol % (i.e., do not contain other units).

The number of types of monomers from which the multi-component copolymer of this disclosure is derived is not specifically limited, as long as the multi-component copolymer has the conjugated diene units, the non-conjugated olefin units and the aromatic vinyl units. However, from the viewpoint of obtaining better crack growth resistance and ozone resistance, it is preferable that the multi-component copolymer of this disclosure is a polymer obtained by performing polymerization at least using as monomers one conjugated diene compound, one non-conjugated olefin compound and one aromatic vinyl compound. In other words, it is preferable that the multi-component copolymer of this disclosure is a multi-component copolymer having one type of conjugated diene units, one type of non-conjugated olefin units and one type of aromatic vinyl units. Furthermore, from the viewpoint of further improving the crack growth resistance and the ozone resistance, the multi-component copolymer of this disclosure is more preferably a tricopolymer consisting exclusively of one type of conjugated diene units, one type of non-conjugated olefin units and one type of aromatic vinyl units, even more preferably a tricopolymer consisting exclusively of butadiene units, ethylene units and styrene units. In this connection, the "one type of conjugated diene units" is inclusive of conjugated diene units of different bonding modes (cis-1,4 bond, trans-1,4 bond, 1,2-vinyl bond, etc.).

A weight-average molecular weight (Mw) of the multi-component copolymer of this disclosure is preferably 10,000 to 10,000,000, more preferably 100,000 to 9,000,000, particularly preferably 150,000 to 8,000,000. By setting the Mw of the multi-component copolymer to 10,000 or more, it is possible to sufficiently ensure the mechanical strength as a material of a rubber article, and by setting the Mw to 10,000,000 or less, it is possible to maintain high operability. In particular, from the viewpoint of sufficiently ensuring the mechanical strength as a material of a rubber article and maintaining high operability, in the multi-component copolymer of this disclosure, inclusive of the case where the conjugated diene units consist exclusively of butadiene units, the Mw is preferably 100,000 to 2,000,000, more preferably 200,000-500,000.

Furthermore, in the multi-component copolymer of this disclosure, a molecular weight distribution (Mw/Mn) represented by the ratio of the weight-average molecular weight (Mw) to a number-average molecular weight (Mn) is 10.0 or less, more preferably 9.0 or less, particularly preferably 8.0 or less. By setting the molecular weight distribution of the multicomponent copolymer to 10.0 or less, it is possible to obtain sufficient homogeneity in physical properties of the multicomponent copolymer.

The aforementioned weight average molecular weight and molecular weight distribution may be obtained via gel permeation chromatography (GPC) with polystyrene as a standard substance.

In the multi-component copolymer of this disclosure, it is preferable that the main chain consists exclusively of an acyclic structure. A main chain consisting exclusively of an acyclic structure is capable of further improving the crack growth resistance.

Here, NMR is used as a principal measurement means for certifying whether the main chain of the copolymer has a cyclic structure. Specifically, if a peak derived from a cyclic structure existing in the main chain (for example, a peak appearing at 10 ppm to 24 ppm as for a three-membered ring to a five-membered ring) cannot be observed, it is indicated that the main chain of the copolymer consists exclusively of an acyclic structure.

Note that in the present Specification, the "main chain" refers to a long chain part connecting bonding terminals of each unit in the copolymer, and may be either a straight chain or a branched chain depending on a chain structure of the copolymer. Namely, the "main chain" is exclusive of branched parts which are not bonded to adjacent units (for example, aromatic groups of the aromatic vinyl units) in each unit constituting the copolymer.

The chain structure of the multi-component copolymer of this disclosure is not specifically limited and may be appropriately selected depending on the purpose as long as the weight-average molecular weight of the chain parts, divided by the conjugated diene units and each containing one or more of the non-conjugated olefin units and/or one or more of the aromatic vinyl units, is 40,000 or more. For example, when the conjugated diene units are defined as A, the non-conjugated olefin units are defined as B, and the aromatic vinyl units are defined as C, the multi-component copolymer of this disclosure may be a block copolymer with a structure of $A_x$-$B_y$—$C_z$ (where x, y and z are integers of 1 or larger), a taper copolymer mixing a structure in which A, B and C are aligned randomly and the structure of the block copolymer, etc.

In the case where the multi-component copolymer of this disclosure is a block copolymer, from the viewpoint of easiness of manufacture, one having at a terminal of the polymer a component containing a conjugated diene compound is preferable, and from the viewpoint of the performances, one having at both terminals of the polymer a component containing a conjugated diene compound is more preferable.

The multi-component copolymer of this disclosure may have either a structure in which the conjugated diene units, the non-conjugated olefin units and the aromatic vinyl units are linked linearly (linear structure) or a structure in which at least any one of the conjugated diene units, the non-conjugated olefin units and the aromatic vinyl units are linked in a manner forming branched chains (branched structure). Note that in the case where the multi-component copolymer of this disclosure has a branched structure, the branched chains may be either binary or multiple (namely, the branched chain may include at least two of the conjugated diene units, the non-conjugated olefin units and the aromatic vinyl units). Therefore, among the multi-component copolymers of this disclosure, the multi-component copolymer with a branched structure having binary or multiple branched chains can be clearly distinguished from a conventional graft copolymer formed with respectively one different type of units in a chain as a stem and in side chains.

The multi-component copolymer of this disclosure, as described in its producing method in the following, can be synthesized in one reaction container, i.e., via one-pot synthesis, and thus can be produced with a simplified process.

(Method for Producing Multicomponent Copolymer)

Next, an example of the method for producing the multi-component copolymer of this disclosure will be described in detail below. The example of the method for producing the multi-component copolymer of this disclosure is on the assumption of using a conjugated diene compound, a non-conjugated olefin compound and an aromatic vinyl compound as monomers. The method includes at least polymerization process, and may further include, as necessary, coupling process, rinsing process, and other processes.

<Polymerization Process>

The polymerization process is a process of polymerizing at least the conjugated diene compound, the non-conjugated olefin compound and the aromatic vinyl compound as monomers. In this connection, the polymerization process preferably includes an operation adding and polymerizing only the non-conjugated olefin compound and/or the aromatic vinyl compound under the existence of a catalyst, without adding the conjugated diene compound. Examples of a method for setting the weight-average molecular weight of the chain parts each containing one or more of the non-conjugated olefin units and/or one or more of the aromatic vinyl units to 50,000 or more include a method appropriately extending the period that only the non-conjugated olefin compound and the aromatic vinyl compound exist as monomers under the existence of a catalyst. Examples of a method for adjusting the weight-average molecular weight of the non-conjugated olefin parts include a method appropriately adjusting the period that only the non-conjugated olefin compound exists as a monomer under the existence of a catalyst.

Note that in the case of using a polymerization catalyst composition described below, since the conjugated diene compound has higher reactivity than the non-conjugated olefin compound and the aromatic vinyl compound, polymerization of the non-conjugated olefin compound and/or the aromatic vinyl compound under the existence of the conjugated diene compound is likely to be difficult. Moreover, in view of the properties of the catalyst, it is likely to be difficult as well to first polymerize the conjugated diene compound, and then perform additional polymerization of the non-conjugated olefin compound and/or the aromatic vinyl compound.

An arbitrary method may be used as the polymerization process, which may include: a solution polymerization; a suspension polymerization; a liquid phase bulk polymerization; an emulsion polymerization; a gas phase polymerization; and a solid phase polymerization. When a solvent is used for the polymerization reaction, any solvent may be used as long as inactive in the polymerization reaction, and examples of such solvent may include toluene, cyclohexane and normal hexane.

In the polymerization process, the polymerization reaction may preferably be performed in an inert gas atmosphere, and preferably in nitrogen or argon atmosphere. The polymerization temperature of the polymerization reaction is not particularly limited, but is preferably in the range of, for example, −100° C. to 200° C., and may also be approximately the room temperature. An increase in polymerization temperature may reduce the cis-1,4-selectivity in the polymerization reaction. The polymerization reaction is preferably performed under pressure in the range of 0.1 MPa to 10.0 MPa so as to allow the conjugated diene compound to be sufficiently introduced into the polymerization system. Further, the reaction time of the polymerization reaction is not particularly limited, and is preferably in the range of, for example, 1 second to 10 days, which may be selected as appropriate depending on conditions such as the type of the catalyst and the polymerization temperature.

In the polymerization of the conjugated diene compound, a polymerization inhibitor such as methanol, ethanol, and isopropanol may be used to stop the polymerization.

In this connection, the polymerization of the aforementioned non-conjugated olefin compound, aromatic vinyl compound and conjugated diene compound is preferably performed under the existence of a first polymerization catalyst composition, a second polymerization catalyst composition, or a third polymerization catalyst composition described in below.

—First Polymerization Catalyst Composition—

An initial polymerization catalyst composition (hereinafter, also referred to as a "first polymerization catalyst composition") will be described.

The first polymerization catalyst composition contains:

component (A): rare-earth element compounds represented by the following formula (I):

(In formula (I), M is selected from scandium, yttrium or lanthanoid elements; $(AQ)^1$, $(AQ)^2$ and $(AQ)^3$ are the same or different functional groups, where A is nitrogen, oxygen or sulfur and has at least one M-A bond).

In this connection, specific examples of the lanthanoid element in the component (A) include lanthanum, cerium, praseodymium, neodymium, promethium, samarium, europium, gadolinium, terbium, dysprosium, holmium, erbium, thulium, ytterbium, and lutetium, which may be used singly or in a combination of two or more. The component (A) is a component capable of improving the catalytic activity in the reaction system, which enables reduction of the reaction time and rise of the reaction temperature.

Moreover, from the viewpoint of improving the catalytic activity and the reaction controllability, the M is preferably gadolinium.

Note that these components (A) may be used singly or in a combination of two or more.

The compound represented by the aforementioned formula (I) has at least one M-A bond. Having one or more M-A bonds is advantageous in terms of allowing each binding to be chemically equivalent and making a structure stable, thereby facilitating handling and enabling manufacture of the multi-component copolymer efficiently at a low cost. Note that the compound represented by the formula (I) may contain a bond other than M-A, for example, a bond of a metal other than the M and a hetero atom such as O and S, etc.

In the formula (I), in the case where A is nitrogen, examples of the functional groups represented by $AQ^1$, $AQ^2$ and $AQ^3$ (i.e., $NQ^1$, $NQ^2$ and $NQ^3$) include amide groups.

Examples of the amide groups include: aliphatic amide groups such as dimethyl amide group, diethyl amide group and diisopropyl amide group; aryl amide groups such as phenyl amide group, 2,6-di-tert-butylphenyl amide group, 2,6-diisopropylphenyl amide group, 2,6-dineopentylphenyl amide group, 2-tert-butyl-6-isopropylphenyl amide group, 2-tert-butyl-6-neopentylphenyl amide group, 2-isopropyl-6-neopentylphenyl amide group and 2,4,6-tert-butylphenyl amide group; and bistrialkylsilyl amide groups such as bistrimethylsilyl amide group. In particular, from the viewpoint of the solubility to an aliphatic hydrocarbon, bistrimethylsilyl amide group is preferable.

These functional groups may be used singly or in a combination of two or more.

In the formula (I), in the case where A is oxygen, examples of the functional groups represented by $AQ^1$, $AQ^2$ and $AQ^3$ (i.e., $OQ^1$, $OQ^2$ and $OQ^3$) include alkoxy groups and acyloxy groups. The alkoxy group is preferably methoxy group, ethoxy group, isopropoxy group, etc. The acyloxy group is preferably acetoxy group, valeroyloxy group, pivaloyloxy group, etc.

These functional groups may be used singly or in a combination of two or more.

In the formula (I), in the case where A is sulfur, examples of the functional groups represented by $AQ^1$, $AQ^2$ and $AQ^3$ (i.e., $SQ^1$, $SQ^2$ and $SQ^3$) include alkylthio groups and alkylsulfonyl groups. The alkylthio group is preferably methylthio group, isopropylthio group, etc. The alkylsulfonyl group is preferably phenylsulfonyl group, isopropanesulfonyl group, hexanesulfonyl group, etc.

These functional groups may be used singly or in a combination of two or more.

Note that in the polymerization reaction system, it is preferable that a concentration of the component (A) contained in the catalyst composition is in the range of 0.1 mol/L to 0.0001 mol/L.

The first polymerization catalyst composition preferably further contains:
 component (B): at least one selected from a group consisting of a specific ionic compound (B-1) and a specific halogen compound (B-2)
 component (C): a compound represented by the following formula (II):

$$YR^1_a R^2_b R^3_c \quad (II)$$

(In formula (II), Y is a metal selected from groups 1, 2, 12 and 13 in the periodic table; $R^1$ and $R^2$ are hydrocarbon groups having a carbon number of 1 to 10 or hydrogen atoms and $R^3$ is a hydrocarbon group having a carbon number of 1 to 10 where $R^1$, $R^2$ and $R^3$ are the same or different, and a=1, b=0, and c=0 in the case where Y is a metal selected from the group 1 in the periodic table, a=1, b=1, and c=0 in the case where Y is a metal selected from the groups 2 and 12 in the periodic table, and a=1, b=1, and c=1 in the case where Y is a metal selected from the group 13 in the periodic table).

If the first polymerization catalyst composition further contains the components (B) and (C), it is possible to produce the multi-component copolymer of the conjugated diene compound, the non-conjugated olefin compound and the aromatic vinyl compound more efficiently.

The ionic compound (B-1) and the halogen compound (B-2) need the component (C) serving as a carbon donor to the component (A) because neither the ionic compound (B-1) nor the halogen compound (B-2) has a carbon atom which can be supplied to the component (A). The first polymerization catalyst composition may further include other components included in a conventional rare earth element compound-containing catalyst composition, e.g., a co-catalyst.

The total content of the component (B) in the first polymerization catalyst composition is preferably 0.1 to 50 times as much as the content of the component (A) in the composition when compared in mol.

The ionic compound as the (B-1) is an ionic compound constituted of a non-coordinating anion and a cation. Examples of the ionic compound (B-1) include an ionic compound capable of being reacted with the rare earth element compound as the compound (A), to generate a cationic transition metal compound.

In this connection, examples of the non-coordinating anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis (pentafluorophenyl)borate, tetrakis(tetrafluoromethylphenyl)borate, tetra(tolyl)borate, tetra (xylyl)borate, triphenyl(pentafluorophenyl)borate, [tris (pentafluorophenyl)](phenyl)borate, tridecahydride-7,8-dicarbaundecaborate, and the like. Examples of the cation include carbonium cation, oxonium cation, ammonium cation, phosphonium cation, cycloheptatrienyl cation, ferrocenium cation having transition metal, and the like. Specific examples of carbonium ion include trisubstituted carbonium cation such as triphenylcarbonium cation, tri(substituted phenyl)carbonium cation, and the like. Specific examples of the tri(substituted phenyl)carbonium cation include tri(methylphenyl)carbonium cation, tri(dimethylphenyl)carbonium cation, and the like. Specific examples of the ammonium cation include: trialkylammonium cation such as trimethylammonium cation, triethylammonium cation, tripropylammonium cation, tributylammonium cation (e.g., tri(n-butyl)ammonium cation); N,N-dialkylanilinium cation such as N,N-dimethylanilinium cation, N,N-diethylanilinium cation, N,N-2,4,6-pentamethylanilinium cation, and the like; and dialkylammonium cation such as diisopropylammonium cation, dicyclohexylammonium cation, and the like. Specific examples of phosphonium cation include triarylphosphonium cation such as triphenylphosphonium cation, tri(methylphenyl)phosphonium cation, tri(dimethylphenyl)phosphonium cation, and the like. A compound as a combination of a non-coordinating anion and a cation selected from the aforementioned examples, respectively, is preferably used as the ionic compound. Specific examples of the ionic compound include N,N-dimethylanilinium tetrakis (pentafluorophenyl)borate, triphenylcarbonium tetrakis (pentafluorophenyl)borate, and the like. These ionic compounds may be used singly or in a combination of two or more.

The total content of the ionic compound (B-1) in the catalyst composition is preferably 0.1 to 10 times, more preferably 1 time as much as the content of the component (A) in the composition when compared in mol.

The halogen compound as the (B-2) is at least one type of halogen compound selected from a Lewis acid, a complex compound of a metal halide and a Lewis base, or an organic compound containing an active halogen. The halogen compound (B-2) is capable of being reacted with the rare earth element compound as the component (A), to generate a cationic transition metal compound, a halide transition metal compound, or a compound with a charge-deficient transition metal center.

The total content of the halogen compound (B-2) in the first polymerization catalyst composition is preferably 1 to 5 times as much as the content of the component (A) when compared in mol.

Examples of the Lewis acid which can be used in this disclosure include a boron-containing halogen compound such as $B(C_6F_5)_3$, an aluminum-containing halogen compound such as $Al(C_6F_5)_3$, and a halogen compound containing a group 3, 4, 5, 6 or 8 element in the periodic table. Preferable examples of the Lewis acid include aluminum halide and organic metal halide. Chlorine or bromine is preferable as the halogen element. Specific examples of the Lewis acid include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride, dibutyl tin dichloride, aluminum tribromide, antimony trichloride, antimony pentachloride, phosphorus trichloride, phosphorus pentachloride, tin tetrachloride, titanium tetrachloride, tungsten hexachloride, and the like. Diethyl aluminum chloride, ethyl aluminum sesquichloride, ethyl aluminum dichloride, diethyl aluminum bromide, ethyl aluminum sesquibromide, and ethyl aluminum dibromide are particularly preferable as the Lewis acid among these examples.

Examples of the metal halide which, together with a Lewis base, constitutes a complex compound include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper bromide, copper iodide, silver chloride, silver bromide, silver iodide, gold chloride, gold iodide, gold bromide, and the like. Magnesium chloride, calcium chloride, barium chloride, manganese chloride, zinc chloride, copper chloride are preferable as the metal halide among these examples. Magnesium chloride, manganese chloride, zinc chloride, copper chloride are particularly preferable.

Further, preferable examples of the Lewis base constituting, together with the metal halide, a complex compound include a phosphorus compound, a carbonyl compound, a nitrogen compound, an ether compound, alcohol, and the like. Specifically, acceptable examples of the Lewis base include tributyl phosphate, tris(2-ethylhexyl) phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethyl-hexanoic acid, oleic acid, stearic acid, benzoic acid, naphthenic acid, versatic acid, triethylamine, N,N-dimethylacetamide, tetrahydrofuran, diphenyl ether, 2-ethyl-hexyl alcohol, oleyl alcohol, stearyl alcohol, phenol, benzyl alcohol, 1-decanol, lauryl alcohol, and the like. Tris(2-ethylhexyl) phosphate, tricresyl phosphate, acetylacetone, 2-ethyl-hexanoic acid, versatic acid, 2-ethyl-hexyl alcohol, 1-decanol, lauryl alcohol are preferable as the Lewis base among these examples.

0.01 to 30 mol (preferably 0.5 to 10 mol) per 1 mol of the metal halide, of the aforementioned Lewis base, is reacted with the metal halide. Metals remaining in the copolymer can be reduced by using a reactant obtained by this reaction between the metal halide and the Lewis base.

Examples of the organic compound containing active halogen include benzyl chloride and the like.

These halogen compounds may be used singly or in a combination of two or more.

The component (C) for use in the first polymerization catalyst composition is a compound represented by the following formula (II):

(In formula (II), Y is a metal selected from groups 1, 2, 12 and 13 in the periodic table; $R^1$ and $R^2$ are hydrocarbon groups with a carbon number of 1 to 10 or hydrogen atoms and $R^3$ is a hydrocarbon group with a carbon number of 1 to 10 where $R^1$, $R^2$ and $R^3$ are the same or different, and a=1, b=0, and c=0 in the case where Y is a metal selected from the group 1 in the periodic table, a=1, b=1, and c=0 in the case where Y is the metal selected from the groups 2 and 12 in the periodic table, and a=1, b=1, and c=1 in the case where Y is the metal selected from the group 13 in the periodic table), preferably an organic aluminum compound represented by the following formula (III):

(In formula (III), $R^1$ and $R^2$ are hydrocarbon groups with a carbon number of 1 to 10 or hydrogen atoms and $R^3$ is a hydrocarbon group with a carbon number of 1 to 10 where $R^1$, $R^2$ and $R^3$ are the same or different). Examples of the organic aluminum compound represented by general formula (III) include trimethyl aluminum, triethyl aluminum, tri-n-propyl aluminum, triisopropyl aluminum, tri-n-butyl aluminum, triisobutyl aluminum, tri-t-butyl aluminum, tripentyl aluminum, trihexyl aluminum, tricyclohexyl aluminum, trioctyl aluminum; diethyl aluminum hydride, di-n-propyl aluminum hydride, di-n-butyl aluminum hydride, diisobutyl aluminum hydride, dihexyl aluminum hydride, diisohexyl aluminum hydride, dioctyl aluminum hydride, diisooctyl aluminum hydride, ethyl aluminum dihydride, n-propyl aluminum dihydride, isobutyl aluminum dihydride, and the like. Triethyl aluminum, triisobutyl aluminum, diethyl aluminum hydride and diisobutyl aluminum hydride are preferable as the organic aluminum compound among these examples. The organic aluminum compounds as the component (C) described above may be used singly or in a combination of two or more. The content of the organic aluminum compound in the first polymerization catalyst composition is preferably 1 to 50 times, more preferably approximately 10 times, as much as the content of the component (A) when compared in mol.

From the viewpoint of synthesizing a copolymer with a high cis-1,4 bond content at a high yield, it is more preferable that the first polymerization catalyst composition further contains:

component (D): a coordination compound capable of serving as an anionic ligand.

The component (D) is not specifically limited as long as exchangeable for the functional groups represented by AQ', $AQ^2$ and $AQ^3$ of the component (A). Examples of the component (D) include one having any one of OH group, NH group and SH group.

Specific examples of the component (D) as a compound having OH group include aliphatic alcohol, aromatic alcohol, and the like. Specific examples of aliphatic alcohol and aromatic alcohol include, but are not limited to, 2-ethyl-1-hexanol, dibutylhydroxytoluene, alkylated phenol, 4,4'-thiobis-(6-t-butyl-3-methylphenol), 4,4'-butylidenebis-(6-t-butyl-3-methylphenol), 2,2'-methylenebis-(4-methyl-6-t-butylphenol), 2,2'-methylenebis-(4-ethyl-6-t-butylphenol), 2,6-di-t-4-ethylphenol, 1,1,3-tris-(2-methyl-4-hydroxy-5-t-butylphenyl)butane, n-octadecyl-3-(4-hydroxy-3,5,-di-t-butylphenyl)propionate, tetrakis[methylene-3-(3,5-di-t-butyl-4-hydroxyphenyl)propionate]methane, dilaurylthiodipropionate, distearylthiodipropionate, dimyristylyl thiopropionate, and the like. Examples of hindered-phenol based compounds in this connection include triethylene glycol-bis[3-(3-t-butyl-5-methyl-4-hydroxyphenyl) propionate], 1,6-hexanediol-bis[3-(3,5-di-t-butyl-4-4-hydroxyphenyl)propionate], 2,4-bis-(n-octylthio)-6-(4-hydroxy-3,5-di-t-butylanilino)-1,3,5-triazine, pentaerythryl-tetrakis[3-(3,5-di-t-butyl-4-hydroxyphenyl)propionate], 2,2-thiodiethylene-bis[3-(3,5-di-t-butyl-4-hydroxyphenyl) propionate], octadecyl-3-(3,5-di-t-butyl-4-hydroxyphenyl)

propionate, N,N'-hexamethylene-bis(3,5-di-t-butyl-4-hydroxy-hydrocinnamide), 3,5-t-butyl-4-hydroxybenzylphosphonate-diethyl ester, 1,3,5-trimethyl-2,4,6-tris(3,5-di-t-butyl-4-hydroxybenzyl)benzene, tris-(3,5-di-t-butyl-4-hydroxybenzyl)-isocyanurate, octylated diphenylamine, 2,4-bis[(octylthio)methyl]¯o-cresol, and the like. Further, examples of hydrazine based compounds in this connection include N,N'-bis[3-(3,5-di-t-butyl-4-hydroxyphenyl)propionyl]hydrazine.

Specific examples of the component (D) having NH group include primary amines and secondary amines such as alkylamine, arylamine and the like. Specific examples of the primary and secondary amines include dimethylamine, diethylamine, pyrrole, ethanolamine, diethanolamine, dicyclohexylamine, N,N'-dibenzylethylenediamine, bis(2-diphenylphosphinophenyl)amine, and the like.

Specific examples of the component (D) having SH group include aliphatic thiol, aromatic thiol, and compounds represented by the following formulae (VI) and (VII).

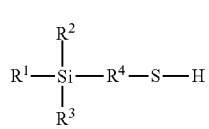

(VI)

(In formula (VI), $R^1$, $R^2$ and $R^3$ each independently represent —O—$C_jH_{2j+1}$, —(O—$C_kH_{2k}$—)$_a$—O—$C_mH_{2m+1}$, or —$C_nH_{2n+1}$; at least one of $R^1$, $R^2$ and $R^3$ is —(O—$C_kH_{2k}$—)$_a$—O—$C_mH_{2m+1}$; j, m and n each independently represent an integer in the range of 0 to 12; k and a each independently represent an integer in the range of 1 to 12; and $R_4$ represents a normal/branched/cyclic, saturated/unsaturated alkylene group, cycloalkylene group, cycloalkylalkylene group, cycloalkenyl alkylene group, alkenylene group, cycloalkenylene group, cycloalkyl alkenylene group, cycloalkenyl alkenylene group, arylene group, or aralkylene group, with a carbon number of an integer in the range of 1 to 12.)

Specific examples of the compounds represented by formula (VI) include (3-mercaptopropyl)trimethoxysilane, (3-mercaptopropyl)triethoxysilane, (3-mercaptopropyl)methyldimethoxysilane, (mercaptomethyl)dimethylethoxysilane, (mercaptomethyl)trimethoxysilane, and the like.

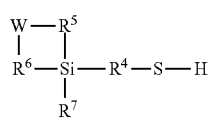

(VII)

(In formula (VII), W represents —$NR^8$—, —O—, or —$CR^9R^{10}$— ($R^8$ and $R^9$ each represent —$C_pH_{2p+1}$, $R^{10}$ represents —$C_qH_{2q+1}$, and p and q each independently represent an integer in the range of 0 to 20); $R^5$ and $R^6$ each independently represent -M-$C_rH_{2r}$— (M represents —O— or —$CH_2$—, r represents an integer in the range of 1 to 20); $R^7$ represents —O—$C_1H_{2j+1}$, —(O—$C_kH_{2k}$—)$_a$—O—$C_mH_{2m+1}$, or —$C_nH_{2n+1}$; j, m and n each independently represent an integer in the range of 0 to 12; k and a each independently represent an integer in the range of 1 to 12; and $R^4$ represents a normal/branched/cyclic, saturated/unsaturated alkylene group, cycloalkylene group, cycloalkylalkylene group, cycloalkenylalkylene group, alkenylene group, cycloalkenylene group, cycloalkylalkenylene group, cycloalkenylalkenylene group, arylene group, or aralkylene group, with a carbon number of 1 to 12.)

Specific examples of the compounds represented by formula (VII) include 3-mercaptopropyl(ethoxy)-1,3-dioxa-6-methylaza-2-silacyclooctane, 3-mercaptopropyl(ethoxy)-1,3-dioxa-6-butylaza-2-silacyclooctane, 3-mercaptopropyl(ethoxy)-1,3-dioxa-6-dodecylaza-2-silacyclooctane, and the like.

It is preferable that the coordination compound as the component (D) is a compound having a cyclopentadiene skeleton.

Further, the compound having a cyclopentadiene skeleton is not specifically limited as long as having a cyclopentadiene skeleton, but is more preferably a compound having indenyl group from the viewpoint of obtaining higher catalytic activity. This is because that it is possible to enhance the activity without using toluene, which has greater environmental load as a solvent used in polymerization.

In this connection, examples of the compound having indenyl group include indene, 1-methylindene, 1-ethylindene, 1-benzylindene, 2-phenylindene, 2-methylindene, 2-ethylindene, 2-benzylindene, 3-methylindene, 3-ethylindene and 3-benzylindene, among which a substituted phenylindenyl compound is preferable.

The component (D) is added by preferably 0.01 to 10 mol, more preferably 0.1 to 1.2 mol, per 1 mol of the rare earth element compound as the component (A). When the component (D) is added by less than 0.01 mol per 1 mol of the rare earth element compound, polymerization of the monomers may not proceed in a satisfactory manner. Adding the component (D) by an amount chemically equivalent to the rare earth element compound (1.0 mol) is particularly preferable and the amount may exceed 1.0 mol. Adding the component (D) by an amount exceeding 10 mol per 1 mol of the rare earth element compound, however, is not recommendable because then too much reagents will be wasted.

—Second Polymerization Catalyst Composition—

Next, a secondary polymerization catalyst composition (hereinafter, also referred to as a "second polymerization catalyst composition") will be described. The second polymerization catalyst composition is a polymerization catalyst composition containing at least one type of complex selected from the group consisting of:

a metallocene complex represented by following formula (IX)

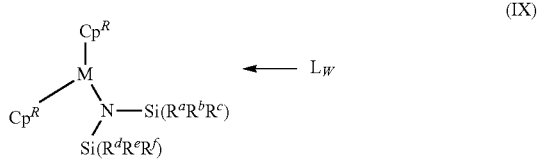

(IX)

(In formula (IX), M represents a lanthanoid element, scandium or yttrium; $Cp^R$s each independently represent unsubstituted/substituted indenyl; $R^a$ to $R^f$ each independently represent an alkyl group with a carbon number of 1 to 3 or hydrogen atom; L represents a neutral Lewis base; and w represents an integer in the range of 0 to 3);

a metallocene complex represented by following formula (X)

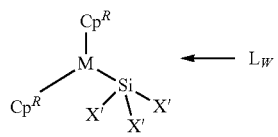
(X)

(In formula (X), M represents a lanthanoid element, scandium or yttrium; $Cp^R$s each independently represent unsubstituted/substituted indenyl; X' represents hydrogen atom, halogen atom, alkoxide group, thiolate group, amide group, silyl group, or a hydrocarbon group having a carbon number of 1 to 20; L represents a neutral Lewis base; and w represents an integer in the range of 0 to 3); and a half metallocene cation complex represented by following formula (XI)

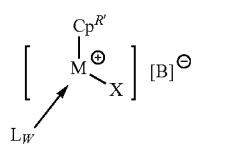
(XI)

(In formula (XI), M represents a lanthanoid element, scandium or yttrium; $Cp^{R'}$ represents unsubstituted/substituted cyclopentadienyl, indenyl or fluorenyl; X represents hydrogen atom, halogen atom, alkoxide group, thiolate group, amide group, silyl group, or a hydrocarbon group having a carbon number of 1 to 20; L represents a neutral Lewis base; and w represents an integer in the range of 0 to 3); and $[B]^-$ represents a non-coordinating anion).

The second polymerization catalyst composition may further include other components included in a conventional metallocene complex-containing polymer catalyst composition, e.g., a co-catalyst. In this disclosure, a "metallocene complex" represents a complex compound in which at least one cyclopentadienyl or derivative thereof is bonded to a core metal. In this connection, a metallocene complex in which only a single cyclopentadienyl or derivative thereof is bonded to a core metal may occasionally be referred to as a "half metallocene complex" in particular.

The concentration of the complex contained in the second polymerization catalyst composition is preferably in the range of 0.1 mol/L to 0.0001 mol/L in the polymerization reaction system.

$Cp^R$s are unsubstituted/substituted indenyls in the metallocene complexes represented by formula (IX) and formula (X). $Cp^R$ having an indenyl ring as the base skeleton may be represented as $C_9H_{7-X}R_X$ or $C_9H_{11-X}R_X$, wherein X is an integer in the range of 0 to 7 or 0 to 11; Rs preferably each represent hydrocarbyl group or metalloid group; and the carbon number of the hydrocarbyl group is preferably in the range of 1 to 20, more preferably in the range of 1 to 10, and even more preferably in the range of 1 to 8. Specifically, preferable examples of the hydrocarbyl group include methyl group, ethyl group, phenyl group, benzyl group and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl and the like. Specific examples of the substituted indenyl include 2-phenylindenyl, 2-methylindenyl, and the like. $Cp^R$s in formula (IX) and formula (X) may be of either the same type or different types.

$Cp^{R'}$ is unsubstituted/substituted cyclopentadienyl, indenyl, or fluorenyl group in the half metallocene cation complex represented by formula (XI). Unsubstituted/substituted indenyl group is preferable as $Cp^{R'}$ among these examples. $Cp^{R'}$ having a cyclopentadienyl ring as the base skeleton is represented as $C_5H_{5-X}R_X$, wherein X is an integer in the range of 0 to 5; Rs preferably each independently represent hydrocarbyl group or metalloid group; and the carbon number of the hydrocarbyl group is preferably in the range of 1 to 20, more preferably in the range of 1 to 10, and even more preferably in the range of 1 to 8. Specifically, preferable examples of the hydrocarbyl group include methyl group, ethyl group, phenyl group, benzyl group and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl and the like. Specific examples of $Cp^{R'}$ having a cyclopentadienyl ring as the base skeleton include compounds represented by the following structural formulae:

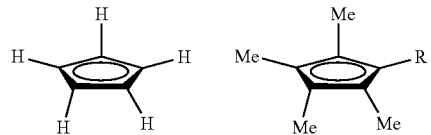

(In these structural formulae, R represents hydrogen atom, methyl group or ethyl group.)

$Cp^{R'}$ having an indenyl ring as the base skeleton, as well as preferable examples thereof, in formula (XI) is defined in the same manner as $Cp^R$ in formula (IX).

$Cp^{R'}$ having a fluorenyl ring as the base skeleton in formula (XI) is represented as $C_{13}H_{9-X}R_X$ or $C_{13}H_{17-X}R_X$, wherein X is an integer in the range of 0 to 9 or 0 to 17; Rs preferably each independently represent hydrocarbyl group or metalloid group; and the carbon number of the hydrocarbyl group is preferably in the range of 1 to 20, more preferably in the range of 1 to 10, and even more preferably in the range of 1 to 8. Specifically, preferable examples of the hydrocarbyl group include methyl group, ethyl group, phenyl group, benzyl group and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl and the like.

The core metal M in each of formulae (IX), (X) and (XI) is a lanthanoid element, scandium or yttrium. The lanthanoid elements include elements having atomic numbers 57 to 71 in the periodic table and any of these elements is acceptable. Preferable examples of the core metal M include samarium Sm, neodymium Nd, praseodymium Pr, gadolinium Gd, cerium Ce, holmium Ho, scandium Sc, and yttrium Y.

The metallocene complex represented by formula (IX) includes a silyl amide ligand $[-N(SiR_3)_2]$. R groups included in the silyl amide ligand (i.e. $R^a$ to $R^f$ in formula (IX)) each independently represent an alkyl group having a carbon number of 1 to 3 or a hydrogen atom. It is preferable that at least one of $R^a$ to $R^f$ is a hydrogen atom. The catalyst can be easily synthesized and a non-conjugated olefin or an aromatic vinyl compound is easily introduced due to relatively little hindrance around the silicon atom when at least one of $R^a$ to $R^f$ is a hydrogen atom. For similar reasons, it is more preferable that at least one of $R^a$ to $R^c$ is a hydrogen atom and at least one of $R^d$ to $R^f$ is a hydrogen atom. Methyl group is preferable as the alkyl group.

The metallocene complex represented by formula (X) includes a silyl ligand [—SiX'$_3$]. X' groups included in the silyl ligand [—SiX'$_3$], as well as preferable examples thereof, are defined in the same manner as X group in formula (XI) described below.

In formula (XI), X is a group selected from the group consisting of hydrogen atom, halogen atom, alkoxide group, thiolate group, amide group, silyl group, and a hydrocarbon group having a carbon number of 1 to 20. Examples of the alkoxide group include: aliphatic alkoxy group such as methoxy group, ethoxy group, propoxy group, n-butoxy group, isobutoxy group, sec-butoxy group, tert-butoxy group, and the like; and aryloxide group such as phenoxy group, 2,6-di-tert-butylphenoxy group, 2,6-diisopropylphenoxy group, 2,6-dineopentylphenoxy group, 2-tert-butyl-6-isopropylphenoxy group, 2-tert-butyl-6-neopentylphenoxy group, 2-isopropyl-6-neopentylphenoxy group, and the like. 2,6-di-tert-butylphenoxy group is preferable as the alkoxide group among these examples.

Examples of the thiolate group represented by X in formula (XI) include: aliphatic thiolate group such as thiomethoxy group, thioethoxy group, thiopropoxy group, n-thiobutoxy group, thoisobutoxy group, sec-thiobutoxy group, tert-thiobutoxy group, and the like; and arylthiolate group such as thiophenoxy group, 2,6-di-tert-butylthiophenoxy group, 2,6-diisopropylthiophenoxy group, 2,6-dineopentylthiophenoxy group, 2-tert-butyl-6-isopropylthiophenoxy group, 2-tert-butyl-6-thioneopentylphenoxy group, 2-isopropyl-6-thioneopentylphenoxy group, 2,4,6-triisopropylthiophenoxy group, and the like. 2,4,6-triisopropylthiophenoxy group is preferable as the thiolate group among these examples.

Examples of the amide group represented by X in formula (XI) include: aliphatic amide group such as dimethyl amide group, diethyl amide group, diisopropyl amide group, and the like; aryl amide group such as phenyl amide group, 2,6-di-tert-butylphenyl amide group, 2,6-diisopropylphenyl amide group, 2,6-dineopentylphenyl amide group, 2-tert-butyl-6-isopropylphenyl amide group, 2-tert-butyl-6-neopentylphenyl amide group, 2-isopropyl-6-neopentylphenyl amide group, 2,4,6-tri-tert-butylphenyl amide group, and the like; and bistrialkylsilyl amide group such as bistrimethylsilyl amide group and the like. Bistrimethylsilyl amide group is preferable as the amide group among these examples.

Examples of the silyl group represented by X in formula (XI) include trimethylsilyl group, tris(trimethylsilyl)silyl group, bis(trimethylsilyl)methylsilyl group, trimethylsilyl (dimethyl)silyl group, (triisopropylsilyl)bis(trimethylsilyl) silyl group, and the like. Tris(trimethylsilyl)silyl group is preferable as the silyl group among these examples.

Acceptable examples of the halogen atom represented by X in formula (XI) include fluorine, chlorine, bromine and iodine atoms. Chlorine or bromine atom is preferable. Specific examples of the hydrocarbon group having a carbon number of 1 to 20 represented by X in formula (XI) include: normal/branched aliphatic hydrocarbon group such as methyl group, ethyl group, n-propyl group, isopropyl group, n-butyl group, isobutyl group, sec-butyl group, tert-butyl group, neopentyl group, hexyl group, octyl group; aromatic hydrocarbon group such as phenyl group, tolyl group, naphthyl group; aralkyl group such as benzyl group; a hydrocarbon group containing silicon atom such as trimethylsilylmethyl group, bistrimethylsilylmethyl group; and the like. Methyl group, ethyl group, isobutyl group, trimethylsilylmethyl group, and the like are preferable as the hydrocarbon group having a carbon number of 1 to 20 among these examples.

Bistrimethylsilyl amide group or a hydrocarbon group having a carbon number of 1 to 20 is preferable as X in formula (XI).

Examples of the non-coordinating anion represented by [B]$^-$ in formula (XI) include quadrivalent boron anion. Specific examples of the quadrivalent boron anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra (tolyl)borate, tetra(xylyl)borate, triphenyl(pentafluorophenyl)borate, [tris(pentafluorophenyl)phenyl]borate, tridecahydride-7,8-dicarbaundecaborate, and the like. Tetrakis(pentafluorophenyl)borate is preferable as the quadrivalent boron anion among these examples.

The metallocene complexes represented by formulae (IX) and (X) and the half metallocene cation complex represented by general formula (XI) each further include 0 to 3, preferably 0 to 1, neutral Lewis base L. Examples of the neutral Lewis base L include tetrahydrofuran, diethyl ether, dimethylaniline, trimethylphosphine, lithium chloride, neutral olefin, neutral diolefin, and the like. The neutral Lewis bases L may be of either the same type or different types when the complex includes a plurality of neutral Lewis bases L.

The metallocene complexes represented by formulae (IX) and (X) and the half metallocene cation complex represented by general formula (XI) may each exist as any of monomer, dimer or another type of multimer.

The metallocene complex represented by formula (IX) can be obtained by, for example, reacting lanthanoid trishalide, scandium trishalide or yttrium trishalide with an indenyl salt (such as potassium or lithium indenyl salt) and a bis(trialkylsilyl)amide salt (such as potassium or lithium salt of bis(trialkylsilyl)amide) in a solvent. The reaction temperature may be set around the room temperature, which allows production in a mild condition. The reaction time may be set as desired and is generally in the range of a few hours to a few days. Type of the reaction solvent is not particularly limited but preferably a solvent capable of dissolving the raw materials and a reaction product. For example, toluene can be used. An example of a reaction for obtaining the metallocene complex represented by formula (IX) is presented below.

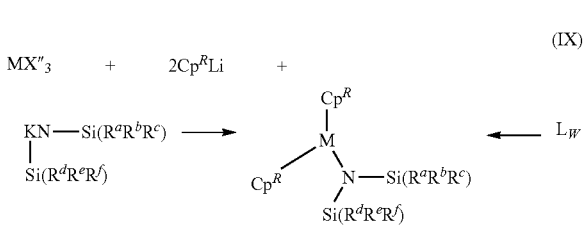

(IX)

(In the reaction example above, X" represents a halide.)

The metallocene complex represented by formula (X) can be obtained by, for example, reacting lanthanoid trishalide, scandium trishalide or yttrium trishalide with an indenyl salt (such as potassium or lithium indenyl salt) and a silyl salt (such as potassium or lithium silyl salt) in a solvent. The reaction temperature may be set around the room temperature, which allows production in a mild condition. The reaction time may be set as desired and is generally in the range of a few to several tens of hours. Type of the reaction solvent is not particularly limited but preferably a solvent capable of dissolving the raw materials and a reaction product. For example, toluene can be used. An example of a reaction for obtaining the metallecene complex represented by formula (X) is presented below.

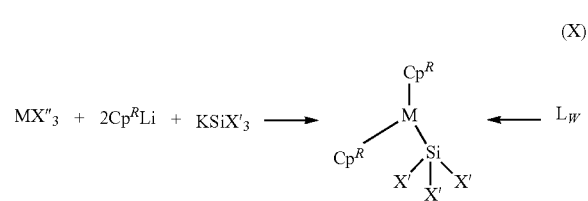

(In the reaction example above, X" represents a halide.)

The half metallocene cation complex represented by formula (XI) can be obtained, for example, by a reaction presented below.

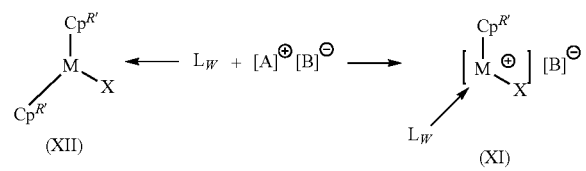

In the compound represented by formula (XII), M represents a lanthanoid element, scandium or yttrium; $Cp^R$'s each independently represent unsubstituted/substituted cyclopentadienyl, indenyl or fluorenyl; and X represents hydrogen atom, halogen atom, alkoxide group, thiolate group, amide group, silyl group, or a hydrocarbon group having a carbon number of 1 to 20. L represents a neutral Lewis base and w represents an integer in the range of 0 to 3. $[A]^+$ represents a cation and $[B]^-$ represents a non-coordinating anion in an ionic compound represented by $[A]^+[B]^-$.

Examples of the cation represented by $[A]^+$ include carbonium cation, oxonium cation, ammonium cation, phosphonium cation, cycloheptatrienyl cation, ferrocenium cation having transition metal, and the like. Examples of the carbonium cation include trisubstituted carbonium cation such as triphenylcarbonium cation, tri(substituted phenyl) carbonium cation, and the like. Specific examples of the tri(substituted phenyl)carbonium cation include tri(methylphenyl)carbonium cation. Examples of the ammonium cation include: trialkylammonium cation such as trimethylammonium cation, triethylammonium cation, tripropylammonium cation, tributylammonium cation; N,N-dialkylanilinium cation such as N,N-dimethylanilinium cation, N,N-diethylanilinium cation, N,N-2,4,6-pentamethylanilinium cation; and dialkylammonium cation such as diisopropylammonium cation, dicyclohexylammonium cation, and the like. Examples of phosphonium cation include triarylphosphonium cation such as triphenylphosphonium cation, tri(methylphenyl)phosphonium cation, tri(dimethylphenyl)phosphonium cation, and the like. N,N-dialkylanilinium cation or carbonium cation is preferable and N,N-dialkylanilinium cation is particularly preferable as $[A]^+$ among these examples.

The ionic compound represented by general formula $[A]^+[B]^-$ for use in the aforementioned reaction is, for example, a compound obtained by combining a non-coordinating anion and a cation respectively selected from the aforementioned examples and preferably N,N-dimethylanilinium tetrakis(pentafluorophenyl)borate, triphenylcarbonium tetrakis(pentafluorophenyl)borate, and the like. The ionic compound represented by general formula $[A]^+[B]^-$ is added to the metallocene complex by an amount preferably 0.1 to 10 times mol, more preferably approximately 1 time mol, as much as the amount of the metallocene complex. In the case where the half metallocene cation complex represented by formula (XI) is used for a polymerization reaction, the half metallocene cation complex represented by formula (XI) may be directly provided into a polymerization reaction system or, alternatively, the half metallocene cation complex represented by formula (XI) may be formed in a polymerization reaction system by providing a compound represented by formula (XII) and the ionic compound represented by general formula $[A]^+[B]^-$ for use in the aforementioned reaction, respectively, in the polymerization reaction system. Further alternatively, the half metallocene cation complex represented by formula (XI) may be formed in a polymerization reaction system by using the metallocene complex represented by formula (IX) or formula (X) and the ionic compound represented by formula $[A]^+[B]^-$ for use in the aforementioned reaction in a combined manner in the polymerization reaction system.

Structures of the metallocene complex represented by formula (IX) or formula (X) and the half metallocene cation complex represented by formula (XI) are each preferably obtained through x-ray structural analysis.

The co-catalyst applicable to the second polymerization catalyst composition can be selected according to necessity from components used as co-catalysts in a conventional polymerization catalyst composition containing a metallocene complex. Preferable examples of the co-catalyst include aluminoxane, an organic aluminum compound, the ionic compounds described above, and the like. These co-catalysts may be used singly or in a combination of two or more.

The aforementioned aluminoxane is preferably alkylaluminoxane and examples thereof include methyl aluminoxane (MAO), modified methyl aluminoxane, and the like. "MMAO-3A", manufactured by Tosoh Finechem Corporation, or the like is preferable as the modified methyl aluminoxane. Provided that "Al/M" represents an element ratio of the aluminum element Al of the aluminoxane with respect to the core metal M of the metallocene complex, the content of the aluminoxane in the second polymerization catalyst composition is set such that the element ratio Al/M is in the range of 10 to 1000 approximately, preferably around 100.

On the other hand, the aforementioned organic aluminum compound is preferably an organic aluminum compound represented by general formula AlRR'R" (in the formula, R and R' each independently represent a hydrocarbon group having a carbon number of 1 to 10 or a hydrogen atom and R" represents a hydrocarbon group having a carbon number of 1 to 10). Examples of the organic aluminum compound include trialkyl aluminum, dialkyl aluminum chloride, alkyl aluminum dichloride, dialkyl aluminum hydride, and the like. Trialkyl aluminum is preferable as the organic aluminum compound among these examples. Examples of trialkyl aluminum include triethyl aluminum, triisobutyl aluminum, and the like. The content of the organic aluminum compound in the aforementioned polymerization catalyst composition is preferably 1 to 50 times, more preferably around 10 times, as much as the content of the metallocene complex in the composition when compared in mol.

The cis-1,4 bond content and/or the molecular weight of a resulting polymer can be increased by using each of the metallocene complex represented by formula (IX) or formula (X) and the half metallocene cation complex represented by formula (XI) with an appropriate co-catalyst in combination in the second polymerization catalyst composition.

—Third Polymerization Catalyst Composition—

Next, a tertiary polymerization catalyst composition (hereinafter, also referred to as a "third polymerization catalyst composition") will be described.

The third polymerization catalyst composition is a compound containing a rare earth element and examples thereof include a polymerization catalyst composition containing a metallocene-based composite catalyst represented by the following formula (XIII)

$$R_a M X_b Q Y_b \tag{XIII}$$

(In formula (XIII), Rs each independently represent unsubstituted/substituted indenyl; M is coordinated with Rs; M represents a lanthanoid element, scandium or yttrium; Xs each independently represent a hydrocarbon group having a carbon number of 1 to 20; M and Q are μ-coordinated with X; Q represents a group 13 element in the periodic table; Ys each independently represent a hydrocarbon group having a carbon number of 1 to 20 or a hydrogen atom; Q is coordinated with Y; and a=b=2).

Preferable examples of the aforementioned metallocene-based composite catalyst include a metallocene-based composite catalyst represented by the following formula (XIV):

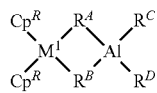
(XIV)

(In formula (XIV), $M^1$ represents a lanthanoid element, scandium or yttrium; $Cp^R$s each independently represent unsubstituted/substituted indenyl; $R^A$ and $R^B$ each independently represent a hydrocarbon group having a carbon number of 1 to 20; $M^1$ and Al are μ-coordinated with $R^A$ and $R^B$; and $R^C$ and $R^D$ each independently represent a hydrocarbon group having a carbon number of 1 to 20 or a hydrogen atom.)

A targeted polymer can be manufactured by using the metallocene-based polymerization catalyst described above. Further, it is possible to reduce an amount of alkyl aluminum for use in the polymer synthesis or even eliminate the alkyl aluminum by using the metallocene-based composite catalyst described above, for example, a catalyst which has been combined with aluminum catalyst in advance to be a composite. It should be noted in this connection that a large amount of alkyl aluminum is needed during the polymer synthesis if the conventional catalyst system is employed. For example, alkyl aluminum must be used by an amount at least 10 times as much as the chemically equivalent amount of a relevant metal catalyst in the conventional catalyst system. In contrast, in the case of using the metallocene-based composite catalyst described above, a good catalytic effect is demonstrated by adding alkyl aluminum by an amount around 5 times as much as the chemically equivalent amount of the metal catalyst.

With regard to the metallocene-based composite catalyst represented by formula (XIII), the metal M is a lanthanoid element, scandium or yttrium. The lanthanoid elements include the fifteen elements having atomic numbers 57 to 71 and any of these elements is acceptable. Preferable examples of the core metal M include samarium Sm, neodymium Nd, praseodymium Pr, gadolinium Gd, cerium Ce, holmium Ho, scandium Sc, and yttrium Y.

In formula (XIII), Rs each independently represent unsubstituted/substituted indenyl and M is coordinated with Rs. Specific examples of the substituted indenyl group include 1,2,3-trimethyl indenyl group, heptamethylindenyl group, 1,2,4,5,6,7-hexamethylindenyl group, and the like.

In formula (XIII), Q represents a group 13 element in the periodic table and specific examples thereof include boron, aluminum, gallium, indium, thallium, and the like.

In formula (XIII), Xs each independently represent a hydrocarbon group having a carbon number of 1 to 20 and M and Q are μ-coordinated with X. Examples of the hydrocarbon group having a carbon number of 1 to 20 include methyl group, ethyl group, propyl group, butyl group, pentyl group, hexyl group, heptyl group, octyl group, decyl group, dodecyl group, tridecyl group, tetradecyl group, pentadecyl group, hexadecyl group, heptadecyl group, stearyl group, and the like. The expression that "M and Q are μ-coordinated with X" represents that M and Q are coordinated with X in a crosslinking manner.

In formula (XIII), Ys each independently represent a hydrocarbon group having a carbon number of 1 to 20 or a hydrogen atom and Q is coordinated with Y. Examples of the hydrocarbon group having a carbon number of 1 to 20 include methyl group, ethyl group, propyl group, butyl group, pentyl group, hexyl group, heptyl group, octyl group, decyl group, dodecyl group, tridecyl group, tetradecyl group, pentadecyl group, hexadecyl group, heptadecyl group, stearyl group, and the like.

In formula (XIV), the metal $M^1$ is a lanthanoid element, scandium or yttrium. The lanthanoid elements include the fifteen elements having atomic numbers 57 to 71 and any of these elements is acceptable. Preferable examples of the core metal $M^1$ include samarium Sm, neodymium Nd, praseodymium Pr, gadolinium Gd, cerium Ce, holmium Ho, scandium Sc, and yttrium Y.

In formula (XIV), $Cp^R$s are unsubstituted/substituted indenyls. $Cp^R$ having an indenyl ring as the base skeleton may be represented as $C_9H_{7-X}R_X$ or $C_9H_{11-X}R_X$, wherein X is an integer in the range of 0 to 7 or 0 to 11; Rs preferably each independently represent hydrocarbyl group or metalloid group; and the carbon number of the hydrocarbyl group is preferably in the range of 1 to 20, more preferably in the range of 1 to 10, and even more preferably in the range of 1 to 8. Specifically, preferable examples of the hydrocarbyl group include methyl group, ethyl group, phenyl group, benzyl group and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl and the like.

Specific examples of the substituted indenyl include 2-phenylindenyl, 2-methylindenyl, and the like. The two $Cp^R$s in formula (XIV) may be of either the same type or different types.

In formula (XIV), $R^A$ and $R^B$ each independently represent a hydrocarbon group having a carbon number of 1 to 20 and $M^1$ and Al are μ-coordinated with $R^A$ and $R^B$. Examples of the hydrocarbon group having a carbon number of 1 to 20 include methyl group, ethyl group, propyl group, butyl group, pentyl group, hexyl group, heptyl group, octyl group, decyl group, dodecyl group, tridecyl group, tetradecyl group, pentadecyl group, hexadecyl group, heptadecyl group, stearyl group, and the like. The expression that "M and Q are μ-coordinated with X" represents that M and Q are coordinated with X in a crosslinking manner.

In formula (XIV), $R^C$ and $R^D$ each independently represent a hydrocarbon group having a carbon number of 1 to 20 or a hydrogen atom. Examples of the hydrocarbon group having a carbon number of 1 to 20 include methyl group, ethyl group, propyl group, butyl group, pentyl group, hexyl group, heptyl group, octyl group, decyl group, dodecyl group, tridecyl group, tetradecyl group, pentadecyl group, hexadecyl group, heptadecyl group, stearyl group, and the like.

The metallocene-based composite catalyst described above can be obtained by reacting a metallocene complex represented by the following formula (XV) with an organic aluminum compound represented by $AlR^K R^L R^M$ in a solvent.

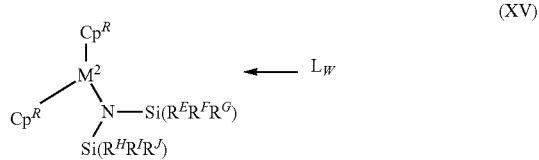

(XV)

(In formula (XV), $M^2$ represents a lanthanoid element, scandium or yttrium; $Cp^R$s each independently represent unsubstituted/substituted indenyl; $R^E$ to $R^J$ each independently represent an alkyl group having a carbon number of 1 to 3 or a hydrogen atom; L represents a neutral Lewis base; and w represents an integer in the range of 0 to 3). The reaction temperature may be set around the room temperature, which allows production in a mild condition. The reaction time may be set as desired and is generally in the range of a few hours to a few days. Type of the reaction solvent is not particularly limited but preferably a solvent capable of dissolving the raw materials and a reaction product. For example, toluene or hexane can be used. The structure of the metallocene-based composite catalyst described above is preferably obtained through $^1$H-NMR or X-ray structural analysis.

In the metallocene complex represented by formula (XV), $Cp^R$s each independently represent unsubstituted/substituted indenyl and are defined in the same manner as $Cp^R$s in formula (XIV); and the metal $M^2$ is a lanthanoid element, scandium or yttrium and defined in the same manner as the metal $M^1$ in formula (XIV).

The metallocene complex represented by formula (XV) includes a silyl amide ligand [—$N(SiR_3)_2$]. R groups included in the silyl amide ligand (i.e. $R^E$ to $R^J$) each independently represent an alkyl group having a carbon number of 1 to 3 or a hydrogen atom. It is preferable that at least one of $R^E$ to $R^J$ is a hydrogen atom. The catalyst can be easily synthesized when at least one of $R^E$ to $R^J$ is a hydrogen atom. For similar reasons, it is more preferable that at least one of $R^E$ to $R^G$ is a hydrogen atom, and at least one of $R^H$ to $R^J$ is a hydrogen atom. Methyl group is preferable as the alkyl group.

The metallocene complex represented by formula (XV) further includes 0 to 3, preferably 0 to 1, neutral Lewis base L. Examples of the neutral Lewis base L include tetrahydrofuran, diethyl ether, dimethylaniline, trimethylphosphine, lithium chloride, neutral olefin, neutral diolefin, and the like. The neutral Lewis bases L may be of either the same type or different types when the complex includes a plurality of neutral Lewis bases L.

The metallocene complex represented by general formula (XV) may exist as any of monomer, dimer or another type of multimer.

The organic aluminum compound for use in generation of the metallocene-based composite catalyst described above is represented by $AlR^K R^L R^M$, wherein $R^K$ and $R^L$ each independently represent a monovalent hydrocarbon group having a carbon number of 1 to 20 or a hydrogen atom; $R^M$ represents a monovalent hydrocarbon group having a carbon number of 1 to 20; and $R^M$ may be of either the same type as or a different type from $R^K$ and $R^L$. Examples of the monovalent hydrocarbon group having a carbon number of 1 to 20 include methyl group, ethyl group, propyl group, butyl group, pentyl group, hexyl group, heptyl group, octyl group, decyl group, dodecyl group, tridecyl group, tetradecyl group, pentadecyl group, hexadecyl group, heptadecyl group, stearyl group, and the like.

Specific examples of the organic aluminum compound include trimethyl aluminum, triethyl aluminum, tri-n-propyl aluminum, triisopropyl aluminum, tri-n-butyl aluminum, triisobutyl aluminum, tri-t-butyl aluminum, tripentyl aluminum, trihexyl aluminum, tricyclohexyl aluminum, trioctyl aluminum; diethyl aluminum hydride, di-n-propyl aluminum hydride, di-n-butyl aluminum hydride, diisobutyl aluminum hydride, dihexyl aluminum hydride, diisohexyl aluminum hydride, dioctyl aluminum hydride, diisooctyl aluminum hydride, ethyl aluminum dihydride, n-propyl aluminum dihydride, isobutyl aluminum dihydride, and the like. Triethyl aluminum, triisobutyl aluminum, diethyl aluminum hydride and diisobutyl aluminum hydride are preferable as the organic aluminum compound among these examples. These organic aluminum compounds may be used singly or in a combination of two or more. An amount of the organic aluminum compound for use in generation of the metallocene-based composite catalyst is preferably 1 to 50 times, more preferably approximately 10 times, as much as the amount of the metallocene complex when compared in mol.

The third polymerization catalyst composition may be composed of the metallocene-based composite catalyst described above and a boron anion. Further, the third polymerization catalyst composition preferably also includes other components, e.g., a co-catalyst, contained in a conventional polymerization catalyst composition containing a metallocene-based catalyst. A catalyst composed of the metallocene-based composite catalyst and a boron anion is occasionally referred to as a "two-component catalyst". It is possible to control contents of respective polymer components in a resulting polymer as desired by using the third polymerization catalyst composition because the third polymerization catalyst composition contains a boron anion, as well as the metallocene-based composite catalyst.

Specific examples of the boron anion constituting a two-component catalyst as the third polymerization catalyst composition include a quadrivalent boron anion. Examples of the quadrivalent boron anion include tetraphenyl borate, tetrakis(monofluorophenyl)borate, tetrakis(difluorophenyl)

borate, tetrakis(trifluorophenyl)borate, tetrakis(tetrafluorophenyl)borate, tetrakis(pentafluorophenyl)borate, tetrakis (tetrafluoromethylphenyl)borate, tetra(tolyl)borate, tetra(xylyl)borate, triphenyl(pentafluorophenyl)borate, [tris(pentafluorophenyl)](phenyl)borate, tridecahydride-7,8-dicarbaundecaborate, and the like. Tetrakis (pentafluorophenyl)borate is preferable as the quadrivalent boron anion among these examples.

The boron anion can be used as an ionic compound in which the boron anion is combined with a cation. Examples of the cation include carbonium cation, oxonium cation, amine cation, phosphonium cation, cycloheptatrienyl cation, ferroceium cation having transition metal, and the like. Specific examples of carbonium cation include trisubstituted carbonium cation such as triphenylcarbonium cation, tri(substituted phenyl)carbonium cation, and the like. Specific examples of the tri(substituted phenyl)carbonium cation include tri(methylphenyl)carbonium cation, and the like. Specific examples of the amine cation include: trialkylammonium cation such as trimethylammonium cation, triethylammonium cation, tripropylammonium cation, tributylammonium cation; N,N-dialkylanilinium cation such as N,N-dimethylanilinium cation, N,N-diethylanilinium cation, N,N-2,4,6-pentamethylanilinium cation, and the like; and dialkylammonium cation such as diisopropylammonium cation, dicyclohexylammonium cation, and the like. Specific examples of phosphonium cation include triarylphosphonium cation such as triphenylphosphonium cation, tri(methylphenyl)phosphonium cation, tri(dimethylphenyl)phosphonium cation, and the like. N,N-dialkylanilinium cation and carbonium cation are preferable and N,N-dialkylanilinium cation is particularly preferable as the cation among these examples. Accordingly, N,N-dimethylanilinium tetrakis(pentafluorophenyl)borate, triphenylcarbonium tetrakis(pentafluorophenyl)borate, and the like are preferable as the ionic compound. The ionic compound composed of the boron anion and the cation is preferably added by an amount 0.1 to 10 times, more preferably approximately 1 time, as much as the amount of the metallocene-based composite catalyst when compared in mol.

The metallocene-based composite catalyst represented by formula (XIV) cannot be synthesized when a boron anion exists in a reaction system for reacting a metallocene catalyst represented by formula (XV) with an organic aluminum compound. Accordingly, preparation of the third polymerization catalyst composition requires synthesizing the metallocene-based composite catalyst in advance, isolating and purifying the metallocene-based composite catalyst thus synthesized, and then combining the metallocene-based composite catalyst with a boron anion.

Preferable examples of the co-catalyst which may be used for the third polymerization catalyst composition include aluminoxane and the like, as well as the aforementioned organic aluminum compound represented by $AlR^K R^L R^M$. Alkylaluminoxane is preferable as the aluminoxane and examples thereof include methyl aluminoxane (MAO), modified methyl aluminoxane, and the like. "MMAO-3A", manufactured by Tosoh Finechem Corporation, or the like is preferable as the modified methyl aluminoxane. The aluminoxanes may be used singly or in a combination of two or more.

<Coupling Process>

Coupling process is a process of carrying out a reaction (a coupling reaction) for modifying at least a portion, e.g., a terminal end, of a polymer chain of the multi-component copolymer obtained by the polymerization process.

The coupling reaction of the coupling process is preferably carried out when the polymerization reaction reaches 100%.

Type of a coupling agent for use in the coupling reaction is not particularly restricted and can be appropriately selected according to the purpose. Examples of the coupling agent include: a tin-containing compound such as bis(maleic acid-1-octadecyl)dioctyltin(IV); an isocyanate compound such as 4,4'-diphenylmethane diisocyanate; an alkoxysilane compound such as glycidyl propyltrimethoxysilane; and the like. These may be used singly or in a combination of two or more.

Bis(maleic acid-1-octadecyl)dioctyltin(IV) is preferable as the coupling agent among these examples in terms of high reaction efficiency and relatively little gel generation.

The number average molecular weight (Mn) can be increased as a result of carrying out the coupling reaction.

<Rinsing Process>

Rinsing process is a process of rinsing a polymer composition obtained by the aforementioned polymerization process. Examples of the solvent include methanol, ethanol, isopropanol, and the like. An acid (such as hydrochloric acid, sulfuric acid, nitric acid) may be added to such a solvent as described above when the solvent is used for a polymerization catalyst composition blended with a Lewis acid-derived catalyst in particular. An amount to be added, of the acid, is preferably 15 mol % or less with respect to the solvent. Addition of the acid by an amount exceeding 15 mol % with respect to the solvent may cause the acid to remain in polymer, possibly adversely affecting mixture, kneading and a vulcanization reaction.

An amount of catalyst residue in copolymer can be decreased to an appropriate level by the rinsing process.

(Rubber Composition)

The rubber composition of this disclosure contains at least the multi-component copolymer of this disclosure, and may further contain, as necessary, a filler, a crosslinking agent, other components, or a rubber component other than the multi-component copolymer of this disclosure. The rubber composition of this disclosure contains at least the multi-component copolymer of this disclosure, and thus has excellent crack growth resistance and ozone resistance.

From the viewpoint of obtaining the desired crack growth resistance and ozone resistance more securely, the content of the multi-component copolymer of this disclosure in the rubber composition of this disclosure is preferably 10 mass % or more, more preferably 15 mass % or more in 100 mass % of the rubber component.

The rubber component other than the multi-component copolymer of this disclosure is not specifically limited and may be appropriately selected depending on the purpose. Examples include polyisoprene, butadiene rubber (BR), acrylonitrile-butadiene rubber (NBR), chloroprene rubber, ethylene-propylene rubber (EPM), ethylene-propylene-non-conjugated diene rubber (EPDM), polysulfide rubber, silicone rubber, fluororubber, and urethane rubber. These may be used singly or in a combination of two or more.

The rubber composition may use a filler as necessary for the purpose of improving reinforcement or the like. The content of the filler is not limited, and may be selected appropriately depending on the purpose; with respect to 100 parts by mass of rubber component, 10 parts by mass to 100 parts by mass is preferable, 20 parts by mass to 80 parts by mass is more preferable, and 30 parts by mass to 60 parts by mass is particularly preferable. The filler compounded in an amount of 10 parts by mass or more provides an effect of improving reinforcement through the compounding of the filler, and the filler compounded in an amount of 100 parts by mass or less can maintain favorable workability while avoiding significant reduction in low heat generating property.

Examples of the filler may include, without being particularly limited thereto, carbon black, silica, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate, with the use of carbon black being preferred. These may be used singly or in a combination of two or more.

The carbon black is not particularly limited, and may be selected as appropriate depending on the application thereof. Examples thereof include FEF, GPF, SRF, HAF, N339, IISAF, ISAF, and SAF. These may be used singly or in a combination of two or more.

The nitrogen absorption specific surface area ($N_2SA$, measured according to JIS K 6217-2:2001) is not particularly limited and may be selected as appropriate depending on the intended use, which may preferably be 20 to 100 $m^2/g$, and more preferably 35 to 80 $m^2/g$. The carbon black having the nitrogen absorption specific surface area ($N_2SA$) of 20 $m^2/g$ or more improves durability of the resulting rubber composition providing sufficient crack growth resistance, and the carbon black having the nitrogen absorption specific surface area ($N_2SA$) of 100 $m^2/g$ or less can maintain favorable workability while avoiding significant reduction in low loss property.

The rubber composition may use a crosslinking agent as necessary. The crosslinking agent may be selected as appropriate depending on the intended use, and the examples thereof may include, without being particularly limited, for example, a sulfur-based crosslinking agent, an organic peroxide-based crosslinking agent, an inorganic crosslinking agent, a polyamine crosslinking agent, a resin crosslinking agent, a sulfur compound-based crosslinking agent, and an oxime-nitrosamine-based crosslinking agent, with the sulfur-based crosslinking agent (vulcanizing agent) being more preferred as the rubber composition for use in tires.

The crosslinking agent above may be contained preferably in the range of 0.1 to 20 parts by mass per 100 parts by mass of the rubber component, which may be selected as appropriate depending on the intended use without being particularly limited. Crosslinking may hardly be progressed with the content of the crosslinking agent falling below 0.1 parts by mass, whereas the content exceeding 20 parts by mass tends to allow some of the crosslinking agent to inadvertently promote crosslinking during the kneading, which may also impair the physical property of the vulcanized product.

When using the vulcanizing agent, vulcanization accelerators may additionally be used in combination. Examples of the vulcanization accelerators may include a guanidine-based compound, an aldehyde-amine-based compound, an aldehyde-ammonia-based compound, a thiazole-based compound, a sulfenamide-based compound, a thiourea-based compound, a thiuram-based compound, a dithiocarbamate-based compound, and a xanthate-based compound. Further, the rubber composition of this disclosure may use, as necessary depending on the intended use, a softener, a vulcanization aid, a colorant, a flame retarder, a lubricant, a foaming agent, a plasticizer, a processing aid, an antioxidant, an age resistor, an antiscorching agent, an anti-ultraviolet agent, an antistatic agent, and other publicly-known compounding agents.

(Crosslinked Rubber Composition)

The crosslinked rubber composition of this disclosure can be obtained by crosslinking the aforementioned rubber composition of this disclosure. The crosslinked rubber composition of this disclosure is derived from the multi-component copolymer of this disclosure, and thus has excellent crack growth resistance and ozone resistance. The crosslinking conditions are not particularly limited and may be selected as appropriate depending on the purpose, and the crosslinking may be performed preferably at a temperature of 120° C. to 200° C. over a warming time of 1 minute to 900 minutes. The crosslinked rubber composition thus obtained, which uses a conjugated diene compound as a monomer from which the rubber component is derived, is excellent in crosslinking property and thus has a higher mechanical property, as compared with a case of EPDM which uses a polymer having a non-conjugated diene compound as a monomer thereof.

(Rubber Article)

The rubber article of this disclosure uses the crosslinked rubber composition of this disclosure. The rubber article of this disclosure contains a crosslinked rubber composition obtained by crosslinking the rubber composition containing the multi-component copolymer of this disclosure, and thus has excellent crack growth resistance and ozone resistance. Type and manufacture method of the rubber article of this disclosure is not specifically limited and may be appropriately selected depending on the purpose. Examples of the "rubber article" include tires, anti-vibration rubbers, seismic isolation rubbers, belts such as conveyor belts, rubber crawlers, and various hoses. The disclosed rubber composition may be applied to any part of the tire with no particular limitation, which may be selected as appropriate depending on the intended use, such as tread rubber, base tread rubber, sidewall rubber, side reinforcing rubber, bead and bead filler. Among these, from the viewpoint of effectively improving the crack growth resistance and the ozone resistance of the tire, the crosslinked rubber composition of this disclosure is preferably used to tread rubber, base tread rubber, sidewall rubber, side reinforcing rubber, etc.

EXAMPLES

In the following, the present disclosure is described in detail with reference to Examples. However, the present disclosure is no way limited to Examples in below.

Synthesis Example 1: Copolymer A 160 g of styrene and 400 mL of toluene were added to a 1000 mL pressure-resistant stainless steel reactor that had been sufficiently dried.

In a glovebox under a nitrogen atmosphere, 0.25 mmol of mono(bis(1,3-tert-butyldimethylsilyl)indenyl)bis(bis(dimethylsilyl)amide)gadolinium complex [1,3-[(t-Bu)Me$_2$Si]$_2$C$_9$H$_5$Gd[N(SiHMe$_2$)$_2$]$_2$], 0.275 mmol of dimethylanilinium tetrakis(pentafluorophenyl)borate [Me$_2$NHPhB(C$_6$F$_5$)$_4$] and 1.4 mmol of diisobutyl aluminum hydride were introduced into a glass container, and were added with 40 mL of toluene, to thereby obtain a catalyst solution.

The catalyst solution was added into the pressure-resistant stainless steel reactor, and was heated to 70° C.

75 mL of a toluene solution containing 15 g of 1,3-butadiene was injected into the pressure-resistant stainless steel reactor over a period of 15 minutes, so as to be copolymerized at 70° C. for 6 hours.

Next, 1 mL of an isopropanol solution containing 5 mass % of 2,2'-methylene-bis(4-ethyl-6-t-butylphenol) (NS-5) was added into the pressure-resistant stainless steel reactor so as to terminate the reaction.

Next, a copolymer was separated by using a large amount of methanol, vacuum dried at 50° C., so as to obtain a copolymer A. Thereby, the polymer A was obtained, and a yield thereof was 130 g.

Synthesis Example 2: Copolymer B 160 g of styrene and 400 mL of toluene were added to a 1000 mL stainless steel pressure-resistant reactor that had been sufficiently dried.

In a glovebox under a nitrogen atmosphere, 0.25 mmol of mono(bis(1,3-tert-butyldimethylsilyl)indenyl)bis(bis(dimethylsilyl)amide)gadolinium complex [1,3-[(t-Bu)Me$_2$Si]$_2$C$_9$H$_5$Gd[N(SiHMe$_2$)$_2$]$_2$], 0.275 mmol of dimethylanilinium tetrakis(pentafluorophenyl)borate [Me$_2$NHPhB (C$_6$F$_5$)$_4$] and 1.4 mmol of diisobutyl aluminum hydride were introduced into a glass container, and were added with 40 mL of toluene, to thereby obtain a catalyst solution. The catalyst solution was added into the pressure-resistant stainless steel reactor, and was heated to 70° C. 100 mL of a toluene solution containing 20 g of 1,3-butadiene was injected into the pressure-resistant stainless steel reactor over a period of 15 minutes, so as to be copolymerized at 70° C. for 6 hours. Then, 100 mL of a toluene solution containing 20 g of 1,3-butadiene was injected into the pressure-resistant stainless steel reactor over a period of 30 minutes, so as to be copolymerized at 70° C. for 1 hour.

Next, 1 mL of an isopropanol solution containing 5 mass % of 2,2'-methylene-bis(4-ethyl-6-t-butylphenol) (NS-5) was added into the pressure-resistant stainless steel reactor so as to terminate the reaction.

Next, a copolymer was separated by using a large amount of methanol, vacuum dried at 50° C., so as to obtain a copolymer B. Thereby, the polymer B was obtained, and a yield thereof was 141 g.

Synthesis Example 3: Copolymer C 160 g of styrene and 400 mL of toluene were added to a 1000 mL stainless steel pressure-resistant reactor that had been sufficiently dried.

In a glovebox under a nitrogen atmosphere, 0.17 mmol of mono(bis(1,3-tert-butyldimethylsilyl)indenyl)bis(bis(dimethylsilyl)amide)gadolinium complex [1,3-[(t-Bu)Me$_2$Si]$_2$C$_9$H$_5$Gd[N(SiHMe$_2$)$_2$]$_2$], 0.187 mmol of dimethylanilinium tetrakis(pentafluorophenyl)borate [Me$_2$NHPhB (C$_6$F$_5$)$_4$] and 1.4 mmol of diisobutyl aluminum hydride were introduced into a glass container, and were added with 40 mL of toluene, to thereby obtain a catalyst solution.

The catalyst solution was added into the pressure-resistant stainless steel reactor, and was heated to 70° C.

150 mL of a toluene solution containing 30 g of 1,3-butadiene was injected into the pressure-resistant stainless steel reactor over a period of 30 minutes, so as to be copolymerized at 70° C. for 6 hours. Then, 150 mL of a toluene solution containing 30 g of 1,3-butadiene was injected into the pressure-resistant stainless steel reactor over a period of 30 minutes, so as to be copolymerized at 70° C. for 1 hour.

Next, 1 mL of an isopropanol solution containing 5 mass % of 2,2'-methylene-bis(4-ethyl-6-t-butylphenol) (NS-5) was added into the pressure-resistant stainless steel reactor so as to terminate the reaction.

Next, a copolymer was separated by using a large amount of methanol, vacuum dried at 50° C., so as to obtain a copolymer C. Thereby, the polymer C was obtained, and a yield thereof was 136 g.

Synthesis Example 4: Copolymer D 160 g of styrene and 400 mL of toluene were added to a 1000 mL stainless steel pressure-resistant reactor that had been sufficiently dried.

In a glovebox under a nitrogen atmosphere, 0.25 mmol of mono(bis(1,3-tert-butyldimethylsilyl)indenyl)bis(bis(dimethylsilyl)amide)gadolinium complex [1,3-[(t-Bu)Me$_2$Si]$_2$C$_9$H$_5$Gd[N(SiHMe$_2$)$_2$]$_2$], 0.275 mmol of dimethylanilinium tetrakis(pentafluorophenyl)borate [Me$_2$NHPhB (C$_6$F$_5$)$_4$] and 1.4 mmol of diisobutyl aluminum hydride were introduced into a glass container, and were added with 40 mL of toluene, to thereby obtain a catalyst solution. The catalyst solution was added into the pressure-resistant stainless steel reactor, and was heated to 70° C. 160 mL of a toluene solution containing 40 g of 1,3-butadiene was injected into the pressure-resistant stainless steel reactor over a period of 15 minutes, so as to be copolymerized at 70° C. for 6 hours. Then, 160 mL of a toluene solution containing 40 g of 1,3-butadiene was injected into the pressure-resistant stainless steel reactor over a period of 30 minutes, so as to be copolymerized at 70° C. for 1 hour.

Next, 1 mL of an isopropanol solution containing 5 mass % of 2,2'-methylene-bis(4-ethyl-6-t-butylphenol) (NS-5) was added into the pressure-resistant stainless steel reactor so as to terminate the reaction.

Next, a copolymer was separated by using a large amount of methanol, vacuum dried at 50° C., so as to obtain a copolymer D. Thereby, the polymer D was obtained, and a yield thereof was 146 g.

Synthesis Example 5: Copolymer E 160 g of styrene and 400 mL of toluene were added to a 1000 mL stainless steel pressure-resistant reactor that had been sufficiently dried.

In a glovebox under a nitrogen atmosphere, 0.25 mmol of mono(bis(1,3-tert-butyldimethylsilyl)indenyl)bis(bis(dimethylsilyl)amide)gadolinium complex [1,3-[(t-Bu)Me$_2$Si]$_2$C$_9$H$_5$Gd[N(SiHMe$_2$)$_2$]$_2$], 0.275 mmol of dimethylanilinium tetrakis(pentafluorophenyl)borate [Me$_2$NHPhB (C$_6$F$_5$)$_4$] and 1.4 mmol of diisobutyl aluminum hydride were introduced into a glass container, and were added with 40 mL of toluene, to thereby obtain a catalyst solution. The catalyst solution was added into the pressure-resistant stainless steel reactor, and was heated to 70° C.

75 mL of a toluene solution containing 15 g of isoprene was injected into the pressure-resistant stainless steel reactor over a period of 15 minutes, so as to be copolymerized at 70° C. for 6 hours.

Next, 1 mL of an isopropanol solution containing 5 mass % of 2,2'-methylene-bis(4-ethyl-6-t-butylphenol) (NS-5) was added into the pressure-resistant stainless steel reactor so as to terminate the reaction.

Next, a copolymer was separated by using a large amount of methanol, vacuum dried at 50° C., so as to obtain a copolymer E. Thereby, the polymer E was obtained, and a yield thereof was 115 g.

Synthesis Example 6: Copolymer a 160 g of styrene and 400 mL of toluene were added to a 1000 mL stainless steel pressure-resistant reactor that had been sufficiently dried.

In a glovebox under a nitrogen atmosphere, 0.25 mmol of mono(bis(1,3-tert-butyldimethylsilyl)indenyl)bis(bis(dimethylsilyl)amide)gadolinium complex [1,3-[(t-Bu)Me$_2$Si]$_2$C$_9$H$_5$Gd[N(SiHMe$_2$)$_2$]$_2$], 0.275 mmol of dimethylanilinium tetrakis(pentafluorophenyl)borate [Me$_2$NHPhB(C$_6$F$_5$)$_4$] and 1.4 mmol of diisobutyl aluminum hydride were introduced into a glass container, and were added with 40 mL of toluene, to thereby obtain a catalyst solution.

The catalyst solution was added into the pressure-resistant stainless steel reactor, and was heated to 70° C.

Next, ethylene was injected at a pressure of 1.5 MPa into the pressure-resistant stainless steel reactor. Further, 75 mL of a toluene solution containing 15 g of 1,3-butadiene was injected into the pressure-resistant stainless steel reactor over a period of 8 hours, so as to be copolymerized at 70° C. for 8.5 hours.

Next, 1 mL of an isopropanol solution containing 5 mass % of 2,2'-methylene-bis(4-ethyl-6-t-butylphenol) (NS-5) was added into the pressure-resistant stainless steel reactor so as to terminate the reaction.

Next, a copolymer was separated by using a large amount of methanol, vacuum dried at 50° C., so as to obtain a copolymer a. Thereby, the polymer a was obtained, and a yield thereof was 105 g.

Synthesis Example 7: Copolymer b 160 g of styrene and 400 mL of toluene were added to a 1000 mL stainless steel pressure-resistant reactor that had been sufficiently dried.

In a glovebox under a nitrogen atmosphere, 0.25 mmol of mono(bis(1,3-tert-butyldimethylsilyl)indenyl)bis(bis(dimethylsilyl)amide)gadolinium complex [1,3-[(t-Bu)Me$_2$Si]$_2$C$_9$H$_5$Gd[N(SiHMe$_2$)$_2$]$_2$], 0.275 mmol of dimethylanilinium tetrakis(pentafluorophenyl)borate [Me$_2$NHPhB(C$_6$F$_5$)$_4$] and 1.4 mmol of diisobutyl aluminum hydride were introduced into a glass container, and were added with 40 mL of toluene, to thereby obtain a catalyst solution.

The catalyst solution was added into the pressure-resistant stainless steel reactor, and was heated to 70° C.

Next, ethylene was injected at a pressure of 1.5 MPa into the pressure-resistant stainless steel reactor and 150 mL of a toluene solution containing 30 g of 1,3-butadiene was injected into the pressure-resistant stainless steel reactor over a period of 8 hours, so as to be copolymerized at 70° C. for 8.5 hours.

Next, 1 mL of an isopropanol solution containing 5 mass % of 2,2'-methylene-bis(4-ethyl-6-t-butylphenol) (NS-5) was added into the pressure-resistant stainless steel reactor so as to terminate the reaction.

Next, a copolymer was separated by using a large amount of methanol, vacuum dried at 50° C., so as to obtain a copolymer b. Thereby, the polymer b was obtained, and a yield thereof was 112 g.

Synthesis Example 8: Copolymer c 80 g of styrene and 300 mL of toluene were added to a 1000 mL stainless steel pressure-resistant reactor that had been sufficiently dried.

In a glovebox under a nitrogen atmosphere, 0.25 mmol of mono(bis(1,3-tert-butyldimethylsilyl)indenyl)bis(bis(dimethylsilyl)amide)gadolinium complex [1,3-[(t-Bu)Me$_2$Si]$_2$C$_9$H$_5$Gd[N(SiHMe$_2$)$_2$]$_2$], 0.275 mmol of dimethylanilinium tetrakis(pentafluorophenyl)borate [Me$_2$NHPhB(C$_6$F$_5$)$_4$] and 1.2 mmol of diisobutyl aluminum hydride were introduced into a glass container, and were added with 40 mL of toluene, to thereby obtain a catalyst solution.

The catalyst solution was added into the pressure-resistant stainless steel reactor, and was heated to 70° C.

Next, ethylene was injected at a pressure of 1.5 MPa into the pressure-resistant stainless steel reactor and 500 mL of a toluene solution containing 100 g of 1,3-butadiene was injected into the pressure-resistant stainless steel reactor over a period of 4 hours, so as to be copolymerized at 70° C. for 5 hours.

Next, 1 mL of an isopropanol solution containing 5 mass % of 2,2'-methylene-bis(4-ethyl-6-t-butylphenol) (NS-5) was added into the pressure-resistant stainless steel reactor so as to terminate the reaction.

Next, a copolymer was separated by using a large amount of methanol, vacuum dried at 50° C., so as to obtain a copolymer c. Thereby, the polymer c was obtained, and a yield thereof was 176 g.

Synthesis Example 9: Copolymer d 220 g of styrene and 700 mL of toluene were added to a 1000 mL stainless steel pressure-resistant reactor that had been sufficiently dried.

In a glovebox under a nitrogen atmosphere, 0.3 mmol of mono(bis(1,3-tert-butyldimethylsilyl)indenyl)bis(bis(dimethylsilyl)amide)gadolinium complex [1,3-[(t-Bu)Me$_2$Si]$_2$C$_9$H$_5$Gd[N(SiHMe$_2$)$_2$]$_2$], 0.33 mmol of dimethylanilinium tetrakis(pentafluorophenyl)borate [Me$_2$NHPhB(C$_6$F$_5$)$_4$] and 1.4 mmol of diisobutyl aluminum hydride were introduced into a glass container, and were added with 40 mL of toluene, to thereby obtain a catalyst solution.

The catalyst solution was added into the pressure-resistant stainless steel reactor, and was heated to 70° C.

Next, ethylene was injected at a pressure of 1.4 MPa into the pressure-resistant stainless steel reactor, so as to be copolymerized at 70° C. for 8 hours.

Next, 1 mL of an isopropanol solution containing 5 mass % of 2,2'-methylene-bis(4-ethyl-6-t-butylphenol) (NS-5) was added into the pressure-resistant stainless steel reactor so as to terminate the reaction.

Next, a copolymer was separated by using a large amount of methanol, vacuum dried at 50° C., so as to obtain a copolymer d. Thereby, the polymer d was obtained, and a yield thereof was 64 g.

(Identification of Multicomponent Copolymer)

The copolymers obtained as described above were measured for a gel permeation chromatography-refractive ratio curve (GPC-RI curve) to confirm characteristic peaks derived from each monomer, and then measured for $^1$H-NMR spectrum and $^{13}$C-NMR spectrum to confirm an aromatic ring skeleton derived from an aromatic vinyl compound, in order to confirm whether or not the copolymer was a tricopolymer.

The copolymers A to E and a to d obtained as described above were evaluated for each property.

<Content of Ethylene, Styrene, Butadiene and Isoprene>

The contents of ethylene, styrene, butadiene and isoprene parts in each copolymer (mol %) were obtained from the integration ratio of each peak of $^1$H-NMR spectrum (100° C., d-tetrachloroethane standard: 6 ppm).

Specifically, their contents were obtained from the integration ratio in the copolymer of aliphatic hydrogen of respectively aromatic hydrogen derived from styrene (5H: 6.4 ppm to 7.4 ppm) と olefin hydrogen derived from 1,4-butadiene bond (2H: 5.3 ppm to 5.5 ppm) or olefin hydrogen derived from 1,4-isoprene bond (1H: 4.9 ppm to 5.2 ppm) and allyl hydrogen derived from isoprene (styrene (3H)+butadiene (4H) or isoprene (7H)+ethylene (1H): 1.4 to 2.4 ppm). The calculated values of each were as indicated in Table 1.

<Weight-Average Molecular Weight of Copolymer>

A polystyrene equivalent weight-average molecular weight (MW) of samples before and after ozonation of each copolymer were obtained through gel permeation chromatography (GPC: HLC-8121GPC/HT, manufactured by Tosoh Corporation, column: two of $GMH_{HR}$-H(S)HT manufactured by Tosoh Corporation, detector: a differential refractometer (RI), trichlorobenzene, GPC measurement temperature: 150° C.), using monodisperse polystyrene as a reference. The result was as indicated in Table 1.

<Content of the Chain Parts Each Containing One or More of the Non-Conjugated Olefin Units and/or One or More of the Aromatic Vinyl Units, Peak Top Molecular Weight, and Weight-Average Molecular Weight>

The ozonolysis method as described in Polymer Preprints, Japan, Vol. 42, No. 4, pp. 1347 was applied. Specifically, 1.0 g of conjugated diene unit parts contained in each copolymer were ozonolyzed, and the obtained components without diene parts (the chain parts each containing one or more of the non-conjugated olefin units and/or one or more of the aromatic vinyl units) were rinsed with methanol and dried. A weight of each dried product (the chain parts each containing one or more of the non-conjugated olefin units and/or one or more of the aromatic vinyl units) were measured, and the contents (mass %) of the chain parts each containing one or more of the non-conjugated olefin units and/or one or more of the aromatic vinyl units were calculated based on a weight of the copolymer before ozonolysis.

Moreover, polystyrene equivalent weight-average molecular weight of each dried product were obtained through gel permeation chromatography [GPC: HLC-8121GPC/HT, manufactured by Tosoh Corporation, column: two of $GMH_{HR}$-H(S)HT manufactured by Tosoh Corporation, detector: a differential refractometer (RI), solvent: trichlorobenzene, GPC measurement temperature: 150° C.], using monodisperse polystyrene as a reference.

Figure 2:
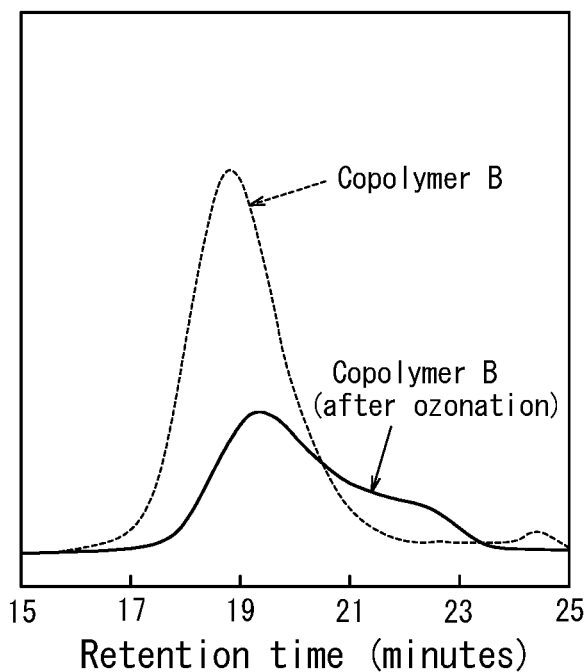
FIG. 2 illustrates high temperature GPC curves before and after ozonation of a copolymer B according to the one embodiment of this disclosure.
Figure 3:
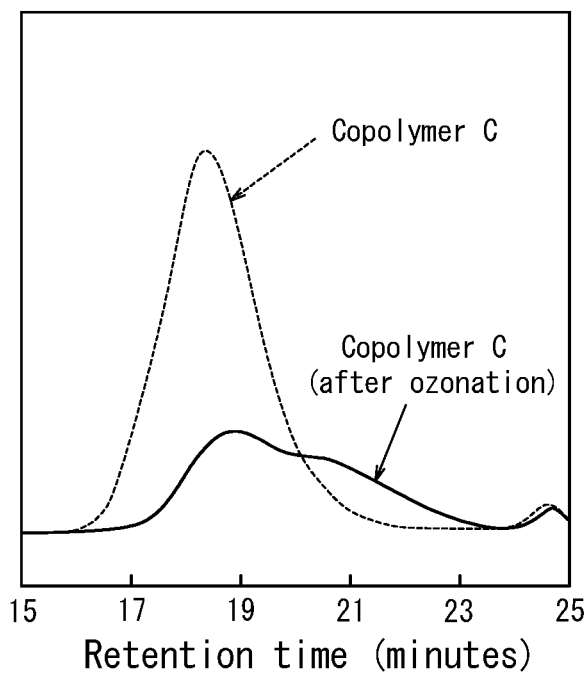
FIG. 3 illustrates high temperature GPC curves before and after ozonation of a copolymer C according to the one embodiment of this disclosure.
Figure 4:
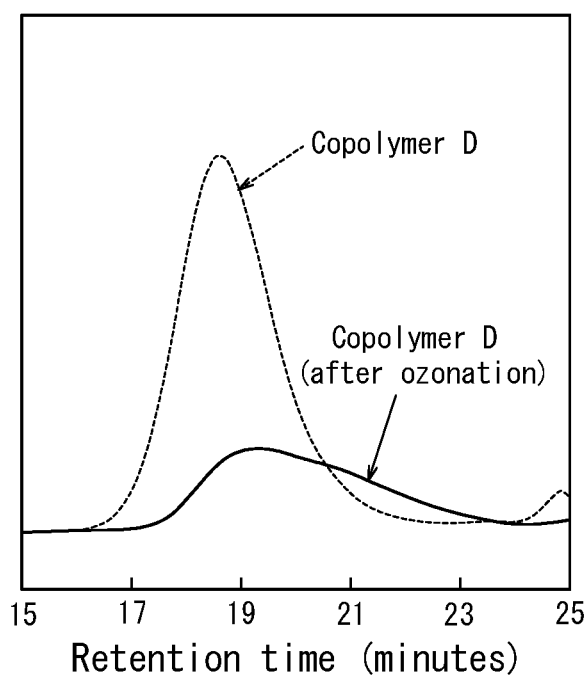
FIG. 4 illustrates high temperature GPC curves before and after ozonation of a copolymer D according to the one embodiment of this disclosure.
Figure 5:
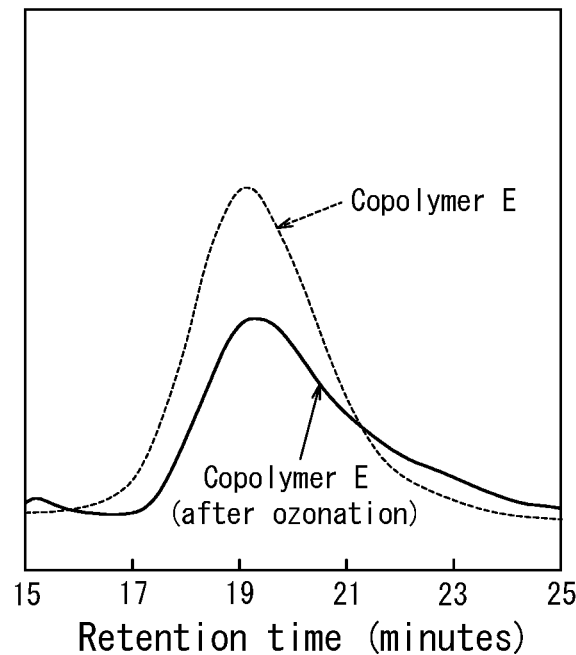
FIG. 5 illustrates high temperature GPC curves before and after ozonation of a copolymer E according to the one embodiment of this disclosure.
Figure 6:
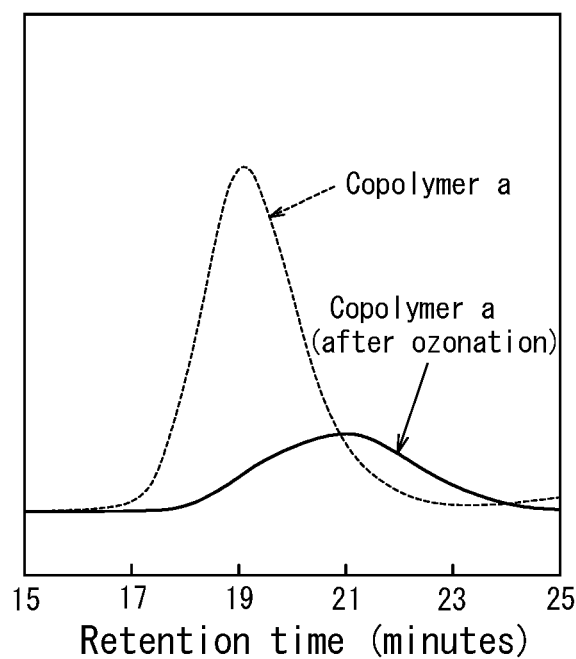
FIG. 6 illustrates high temperature GPC curves before and after ozonation of a copolymer a used as a rubber component of a comparative example.
Figure 7:
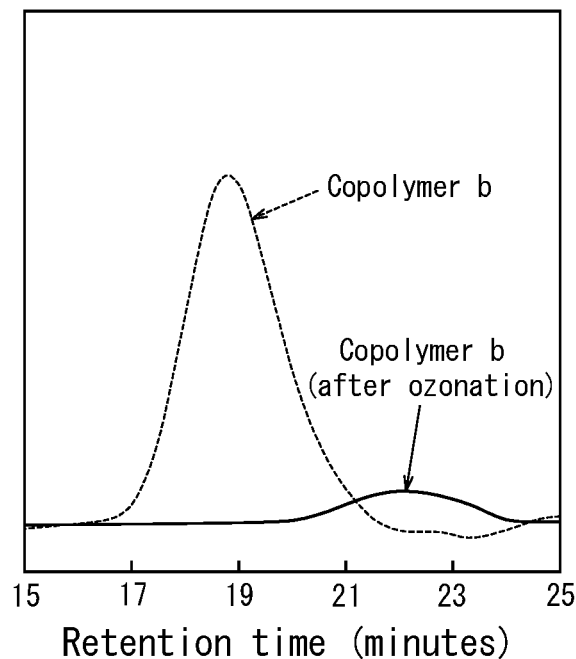
FIG. 7 illustrates high temperature GPC curves before and after ozonation of a copolymer b used as a rubber component of a comparative example.
Figure 8:
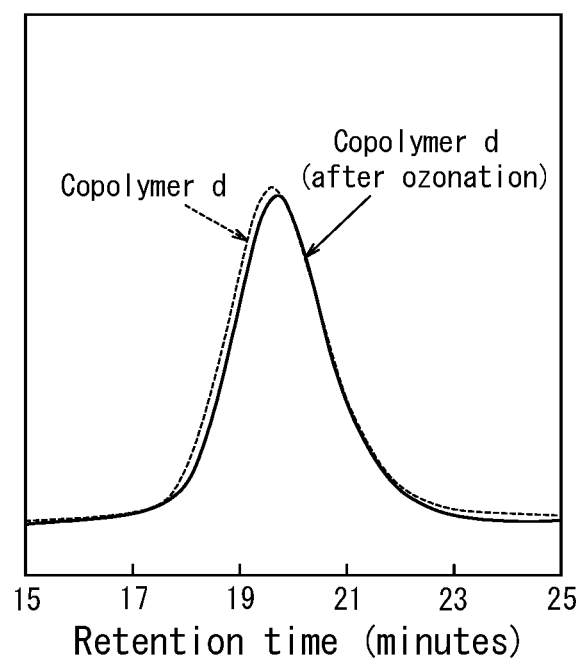
FIG. 8 illustrates high temperature GPC curves before and after ozonation of a copolymer d used as a rubber component of a comparative example.

GPC chromatograms of each copolymer other than copolymer c were as illustrated in FIGS. 1 to 8, and analysis values of each copolymer were as indicated in Table 1. In the GPC chromatograms in FIGS. 1 to 8, the vertical axes indicate component concentration of each copolymer in response to change of the refractive ratio (RI), and the horizontal axes indicate column retention time (minute). A larger molecular weight shortens the column retention time, and a smaller molecular weight elongates the column retention time.

As understood from FIGS. 1 to 8, it was certified that each sample after ozonolysis, i.e., the chain parts each containing one or more of the non-conjugated olefin units and/or one or more of the aromatic vinyl units, contained little component having a polystyrene equivalent molecular weight of 1,000 or less (column retention time: around 24 minutes or more). Moreover, it is understood that since no component as a product of ozonolysis was obtained from the copolymer c, its chain parts each containing one or more of the non-conjugated olefin units and/or one or more of the aromatic vinyl units contained little component having a polystyrene equivalent molecular weight of 1,000 or more.

(Preparation and Evaluation of Rubber Composition)

Rubber compositions were prepared by using each of the copolymers A to D and a to d according to the formulations as indicated in Table 2, with a conventional method. Next, each rubber composition was crosslinked (vulcanized) at 160° C. for 30 minutes, so as to obtain crosslinked rubber compositions. Each obtained crosslinked rubber composition was measured for the crack growth resistance and the ozone resistance with the following method. The result was as indicated in Table 2.

Moreover, rubber compositions were prepared by using the copolymers A to D and a to d according to the formulations as indicated in Table 3, with a conventional method. Next, these rubber compositions were crosslinked (vulcanized) at 160° C. for 20 minutes, so as to obtain crosslinked rubber compositions. Each obtained crosslinked rubber composition was measured for the crack growth resistance and the ozone resistance with the following method. The result was as indicated in Table 3.

<Crack Growth Resistance>

A crack of 0.5 mm was generated at a center of a JIS3 specimen which then underwent cyclic fatigue under a strain of 0 to 60% at 60° C. The number of times when the test sample was cut was measured. The result of each is indexed with the result of Comparative Example 1 as 100. A larger index indicates better crack growth resistance. Tables 2 and 3 indicate the result.

<Ozone Resistance>

The ozone resistance of each obtained copolymer was measured according to JIS K 6259:2004. Rectangular test specimens were exposed at 40° C. and ozone concentration of 50 pphm under 30% dynamic stretching. Then, the conditions of the specimens after 48 hours were visually examined (for cracks). Tables 2 and 3 indicate the result.

TABLE 1

|  | Copolymer A | Copolymer B | Copolymer C | Copolymer D | Copolymer E |
| --- | --- | --- | --- | --- | --- |
| Compound from which conjugated diene units are derived | Butadiene | Butadiene | Butadiene | Butadiene | Isoprene |
| Content of conjugated diene units [mol %] | 8 | 21 | 37 | 48 | 7 |
| Content of aromatic vinyl units [mol %] | 12 | 11 | 15 | 12 | 10 |
| Content of non-conjugated olefin units [mol %] | 80 | 68 | 48 | 40 | 83 |
| Weight-average molecular weight (Mw) of copolymer | 285,000 | 321,000 | 420,000 | 382,000 | 215,000 |
| Content of chain parts each containing one or more [mass %] of the non-conjugated olefin units and/or one or more of the aromatic vinyl units | 76 | 47 | 35 | 26 | 71 |
| Weight-average molecular weight (Mw) of chain parts each containing one or more of the non-conjugated olefin units and/or one or more of the aromatic vinyl units | 226,000 | 202,000 | 193,000 | 137,000 | 191,000 |
| Peak top molecular weight (Mp) of chain parts each containing one or more of the non-conjugated olefin units and/or one or more of the aromatic vinyl units | 261,000 | 243,000 | 285,000 | 221,000 | 206,000 |

TABLE 1-continued

|  | Copolymer a | Copolymer b | Copolymer c | Copolymer d |
|---|---|---|---|---|
| Compound from which conjugated diene units are derived | Butadiene | Butadiene | Butadiene | Butadiene |
| Content of conjugated diene units [mol %] | 10 | 20 | 48 | 0 |
| Content of aromatic vinyl units [mol %] | 11 | 13 | 8 | 13 |
| Content of non-conjugated olefin units [mol %] | 79 | 67 | 44 | 87 |
| Weight-average molecular weight (Mw) of copolymer | 267,000 | 305,000 | 396,000 | 182,000 |
| Content of chain parts each containing one or more [mass %] of the non-conjugated olefin units and/or one or more of the aromatic vinyl units | 28 | 6 | 0 | 100 |
| Weight-average molecular weight (Mw) of chain parts each containing one or more of the non-conjugated olefin units and/or one or more of the aromatic vinyl units | 42,000 | 21,000 | — | 182,000 |
| Peak top molecular weight (Mp) of chain parts each containing one or more of the non-conjugated olefin units and/or one or more of the aromatic vinyl units | 39,000 | 17,000 | — | 152,000 |

TABLE 2

|  |  | Example 1 | Example 2 | Example 3 | Example 4 | Example 5 | Comparative Example 1 |
|---|---|---|---|---|---|---|---|
| Formulation (parts by mass) | BR*1 | 85 | 60 | 40 | 0 | 70 | 100 |
|  | Copolymer A | 15 | — | — | — | — | — |
|  | Copolymer B | — | 40 | — | — | — | — |
|  | Copolymer C | — | — | 60 | — | — | — |
|  | Copolymer D | — | — | — | 100 | — | — |
|  | Copolymer E | — | — | — | — | 30 | — |
|  | Copolymer a | — | — | — | — | — | — |
|  | Copolymer b | — | — | — | — | — | — |
|  | Copolymer c | — | — | — | — | — | — |
|  | Copolymer d | — | — | — | — | — | — |
|  | EPDM*2 | — | — | — | — | — | — |
|  | Stearic acid | 2 | 2 | 2 | 2 | 2 | 2 |
|  | Carbon black*3 | 50 | 50 | 50 | 50 | 50 | 50 |
|  | Age resistor*4 | 0.5 | 0.5 | 0.5 | 0.5 | 0.5 | 0.5 |
|  | Zinc oxide | 3 | 3 | 3 | 3 | 3 | 3 |
|  | Vulcanization accelerator A*5 | 0.4 | 0.4 | 0.4 | 0.4 | 0.4 | 0.4 |
|  | Vulcanization accelerator B*6 | 0.2 | 0.2 | 0.2 | 0.2 | 0.2 | 0.2 |
|  | Sulfur | 1.4 | 1.4 | 0.2 | 0.2 | 0.2 | 1.4 |
|  | Crosslinking agent*7 | 0 | 0 | 0 | 0 | 0 | 0 |
| Crack growth resistance (index) |  | 118 | 180 | 245 | 172 | 142 | 100 |
| Dynamic ozone resistance Cracks after 48 hours |  | Absence | Absence | Absence | Absence | Absence | Presence |

|  |  | Comparative Example 2 | Comparative Example 3 | Comparative Example 4 | Comparative Example 5 | Comparative Example 6 |
|---|---|---|---|---|---|---|
| Formulation (parts by mass) | BR*1 | 85 | 60 | 0 | 85 | 85 |
|  | Copolymer A | — | — | — | — | — |
|  | Copolymer B | — | — | — | — | — |
|  | Copolymer C | — | — | — | — | — |
|  | Copolymer D | — | — | — | — | — |
|  | Copolymer E | — | — | — | — | — |
|  | Copolymer a | 15 | — | — | — | — |
|  | Copolymer b | — | 40 | — | — | — |
|  | Copolymer c | — | — | 100 | — | — |
|  | Copolymer d | — | — | — | 15 | — |
|  | EPDM*2 | — | — | — | — | 15 |
|  | Stearic acid | 2 | 2 | 2 | 2 | 2 |
|  | Carbon black*3 | 50 | 50 | 50 | 50 | 50 |
|  | Age resistor*4 | 0.5 | 0.5 | 0.5 | 0.5 | 0.5 |
|  | Zinc oxide | 3 | 3 | 3 | 0 | 3 |
|  | Vulcanization accelerator A*5 | 0.4 | 0.4 | 0.4 | 0 | 0.4 |
|  | Vulcanization accelerator B*6 | 0.2 | 0.2 | 0.2 | 0 | 0.2 |
|  | Sulfur | 0.2 | 0.2 | 0.2 | 0 | 1.4 |
|  | Crosslinking agent*7 | 0 | 0 | 0 | 3.0 | 0 |
| Crack growth resistance (index) |  | 103 | 97 | 76 | 86 | 89 |
| Dynamic ozone resistance Cracks after 48 hours |  | Presence | Presence | Presence | Presence | Absence |

TABLE 3

|  |  | Example 6 | Example 7 | Example 8 | Example 9 | Comparative Example 7 | Comparative Example 8 |
|---|---|---|---|---|---|---|---|
| Formulation (parts by mass) | NR*8 | 80 | 60 | 40 | 20 | 100 | 80 |
|  | Copolymer A | 20 | — | — | — | — | — |
|  | Copolymer B | — | 40 | — | — | — | — |
|  | Copolymer C | — | — | 60 | — | — | — |
|  | Copolymer D | — | — | — | 80 | — | — |
|  | Copolymer E | — | — | — | — | — | — |
|  | Copolymer a | — | — | — | — | — | 20 |
|  | Copolymer b | — | — | — | — | — | — |
|  | Copolymer c | — | — | — | — | — | — |
|  | Copolymer d | — | — | — | — | — | — |
|  | EPDM*2 | — | — | — | — | — | — |
|  | Stearic acid | 2 | 2 | 2 | 2 | 2 | 2 |
|  | Carbon black*3 | 50 | 50 | 50 | 50 | 50 | 50 |
|  | Age resistor*4 | 1 | 1 | 1 | 1 | 1 | 1 |
|  | Zinc oxide | 3 | 3 | 3 | 3 | 3 | 3 |
|  | Vulcanization accelerator A*5 | 0.4 | 0.4 | 0.4 | 0.4 | 0.4 | 0.4 |
|  | Vulcanization accelerator B*6 | 0.2 | 0.2 | 0.2 | 0.2 | 0.2 | 0.2 |
|  | Sulfur | 1.4 | 1.4 | 0.2 | 1.4 | 1.4 | 0.2 |
|  | Crosslinking agent*7 | 0 | 0 | 0 | 0 | 0 | 0 |
| Crack growth resistance (index) |  | 112 | 158 | 184 | 108 | 100 | 98 |
| Dynamic ozone resistance Cracks after 48 hours |  | Absence | Absence | Absence | Absence | Presence | Presence |

|  |  | Comparative Example 9 | Comparative Example 10 | Comparative Example 11 | Comparative Example 12 |
|---|---|---|---|---|---|
| Formulation (parts by mass) | NR*8 | 60 | 20 | 80 | 80 |
|  | Copolymer A | — | — | — | — |
|  | Copolymer B | — | — | — | — |
|  | Copolymer C | — | — | — | — |
|  | Copolymer D | — | — | — | — |
|  | Copolymer E | — | — | — | — |
|  | Copolymer a | — | — | — | — |
|  | Copolymer b | 40 | — | — | — |
|  | Copolymer c | — | 80 | — | — |
|  | Copolymer d | — | — | 20 | — |
|  | EPDM*2 | — | — | — | 20 |
|  | Stearic acid | 2 | 2 | 2 | 2 |
|  | Carbon black*3 | 50 | 50 | 50 | 50 |
|  | Age resistor*4 | 1 | 1 | 1 | 1 |
|  | Zinc oxide | 3 | 3 | 0 | 3 |
|  | Vulcanization accelerator A*5 | 0.4 | 0.4 | 0 | 0.4 |
|  | Vulcanization accelerator B*6 | 0.2 | 0.2 | 0 | 0.2 |
|  | Sulfur | 0.2 | 0.2 | 0 | 1.4 |
|  | Crosslinking agent*7 | 0 | 0 | 3.0 | 0 |
| Crack growth resistance (index) |  | 92 | 84 | 88 | 72 |
| Dynamic ozone resistance Cracks after 48 hours |  | Presence | Presence | Presence | Absence |

Tables 1 to 3 indicate that each of the rubber compositions of Examples 1 to 4 and 6 to 9, respectively containing the multi-component copolymers A to D of this disclosure which have conjugated diene units, non-conjugated olefin units and aromatic vinyl units, and have a weight-average molecular weight of the chain parts partitioned by the conjugated diene units, each containing one or more of the non-conjugated olefin units and/or one or more of the aromatic vinyl units, of 50,000 or more, had excellent crack growth resistance and ozone resistance.

INDUSTRIAL APPLICABILITY

The multicomponent copolymer of this disclosure may be used for a rubber composition as raw materials for rubber articles such as tires, vibration-insulating rubbers, seismic isolation rubbers, belts of conveyer belts, rubber crawlers, and various hoses. In particular, it may be used for a rubber composition as raw materials for rubber articles that are required to have crack growth resistance and ozone resistance.

The invention claimed is:

1. A multi-component copolymer comprising a conjugated diene unit, a non-conjugated olefin unit and an aromatic vinyl unit, wherein:

the multi-component copolymer has a structure in which the conjugated diene units, the non-conjugated olefin units and the aromatic vinyl units are linked linearly, the non-conjugated olefin unit consists exclusively of ethylene unit, a content of the non-conjugated olefin unit is 40 mol % or more, and a weight-average molecular weight of chain parts, divided by the conjugated diene unit and each containing the non-conjugated olefin units and/or the aromatic vinyl units, is 50,000 or more, wherein the chain parts are components obtained by ozonolyzing the conjugated diene unit parts contained in the multi-component copolymer.

2. The multi-component copolymer according to claim 1, wherein:
a peak top molecular weight of the chain parts, divided by the conjugated diene unit and each containing the non-conjugated olefin units and/or the aromatic vinyl units, is 40,000 or more.

3. The multi-component copolymer according to claim 1, wherein:
a content of the chain parts, divided by the conjugated diene unit and each containing the non-conjugated olefin units and/or the aromatic vinyl units, based on a weight of the multi-component copolymer before ozonolysis is 20 mass % or more.

4. The multi-component copolymer according to claim 1, wherein:
the weight-average molecular weight of the chain parts, divided by the conjugated diene unit and each containing the non-conjugated olefin units and/or the aromatic vinyl units, is 100,000 or more.

5. The multi-component copolymer according to claim 1, wherein:
a content of the conjugated diene unit is 50 mol % or less.

6. The multi-component copolymer according to claim 1, wherein:
a content of the aromatic vinyl unit is 10 mol % or more.

7. The multi-component copolymer according to claim 1, wherein:
the aromatic vinyl unit comprise a styrene unit.

8. The multi-component copolymer according to claim 1, wherein:
the conjugated diene unit comprise a butadiene unit and/or a isoprene unit.

9. The multi-component copolymer according to claim 1, being a terpolymer consisting of a butadiene unit as the conjugated diene unit, an ethylene unit as the non-conjugated olefin unit, and a styrene unit as the aromatic vinyl unit.

10. The multi-component copolymer according to claim 1, having a weight-average molecular weight of 100,000 to 2,000,000.

11. A rubber composition comprising the multi-component copolymer according to claim 1.

12. The rubber composition according to claim 11, comprising 10 mass % or more of the multi-component copolymer in 100 mass % of a rubber component.

13. A crosslinked rubber composition being a crosslinked product of the rubber composition according to claim 11.

14. A rubber article comprising the crosslinked rubber composition according to claim 13.

15. The multi-component copolymer according to claim 1, wherein:
a peak top molecular weight of the chain parts, divided by the conjugated diene unit and each containing the non-conjugated olefin units and/or the aromatic vinyl units, is 40,000 or more; and,
a content of the chain parts, divided by the conjugated diene unit and each containing the non-conjugated olefin units and/or the aromatic vinyl units, based on a weight of the multi-component copolymer before ozonolysis is 20 mass % or more.

16. The multi-component copolymer according to claim 1, wherein:
a peak top molecular weight of the chain parts, divided by the conjugated diene unit and each containing the non-conjugated olefin units and/or the aromatic vinyl units, is 40,000 or more; and,
the weight-average molecular weight of the chain parts, divided by the conjugated diene unit and each containing the non-conjugated olefin units and/or the aromatic vinyl units, is 100,000 or more.

17. The multi-component copolymer according to claim 1, wherein:
a peak top molecular weight of the chain parts, divided by the conjugated diene unit and each containing the non-conjugated olefin units and/or the aromatic vinyl units, is 40,000 or more; and,
a content of the conjugated diene unit is 50 mol % or less.

* * * * *